United States Patent
Coupal et al.

(10) Patent No.: US 6,931,574 B1
(45) Date of Patent: Aug. 16, 2005

(54) SYSTEMS AND METHODS FOR INTERPRETING COMMUNICATIONS PACKETS

(75) Inventors: Dominic Coupal, Santa Clara, CA (US); Jim Stager, Cupertino, CA (US); Mark Farley, Napa, CA (US); Doug Durham, Sunnyvale, CA (US)

(73) Assignee: Finisar Corporation, Sunnyvale, CA (US)

( * ) Notice: Subject to any disclaimer, the term of this patent is extended or adjusted under 35 U.S.C. 154(b) by 425 days.

(21) Appl. No.: 10/001,454

(22) Filed: Oct. 24, 2001

(51) Int. Cl.[7] .............................................. G06F 11/00
(52) U.S. Cl. .......................... 714/39; 715/530; 709/230
(58) Field of Search .................... 714/37, 39; 709/224, 709/230–232; 715/530

(56) References Cited

U.S. PATENT DOCUMENTS

| | | | |
|---|---|---|---|
| 5,347,524 A | | 9/1994 | I'Anson et al. |
| 5,850,388 A | * | 12/1998 | Anderson et al. ........... 370/252 |
| 6,122,757 A | | 9/2000 | Kelley |
| 6,219,050 B1 | | 4/2001 | Schaffer |
| 6,493,761 B1 | * | 12/2002 | Baker et al. ................. 709/230 |
| 6,665,725 B1 | * | 12/2003 | Dietz et al. .................. 709/230 |
| 2004/0083299 A1 | * | 4/2004 | Dietz et al. .................. 709/230 |

FOREIGN PATENT DOCUMENTS

| | | | | |
|---|---|---|---|---|
| JP | 2002281111 A | * | 9/2002 | ........... H04L/29/14 |

* cited by examiner

*Primary Examiner*—Robert Beausoliel
*Assistant Examiner*—Timothy M. Bonura
(74) *Attorney, Agent, or Firm*—Workman Nydegger

(57) ABSTRACT

Presently preferred embodiments of the current invention are directed to a protocol analyzer for interpreting data frames captured on a communications network. The protocol analyzer includes a network interface connection for providing the electrical and physical connection to the communications network and for receiving data frames from the network in a particular physical layer protocol format. The protocol analyzer further includes analysis software for providing an interpretation of received data frames. The interpretation of a frame is based upon a series of definition constructs that are stored in a protocol definition file and a protocol database of the protocol analyzer. The definition constructs collectively define the characteristics of a data frame for a given physical layer protocol. Also, the constructs provide a means for identifying any one of a number of higher level protocols that may be embedded within the data frame.

Also disclosed is a graphical user interface for use as a protocol editor for assembling the necessary definition constructs for inclusion in a protocol definition file. Further, embodiments of a graphical interface for displaying the results of interpreted frames is also disclosed.

20 Claims, 12 Drawing Sheets

SYSTEMS AND METHODS FOR INTERPRETING COMMUNICATIONS PACKETS

BACKGROUND OF THE INVENTION

1. The Field of the Invention

The present invention relates generally to communications networks. More particularly, the present invention relates to systems and methods for interpreting the content of data frames that are present on a communications network.

2. The Relevant Technology

Computer and data communications networks continue to proliferate due to declining costs, increasing performance of computer and networking equipment, and increasing demand for communication bandwidth. Communications networks—including wide area networks ("WANs") and local area networks ("LANs")—allow increased productivity and utilization of distributed computers or stations through the sharing of resources, the transfer of voice and data, and the processing of voice, data and related information at the most efficient locations. Moreover, as organizations have recognized the economic benefits of using communications networks, network applications such as electronic mail, voice and data transfer, host access, and shared and distributed databases are increasingly used as a means to increase user productivity. This increased demand, together with the growing number of distributed computing resources, has resulted in a rapid expansion of the number of installed networks.

As the demand for networks has grown, network technology has grown to include many different physical configurations. Examples include Ethernet, Token Ring, Fiber Distributed Data Interface ("FDDI"), Fibre Channel, and InfiniBand networks. These and the many other types of networks that have been developed typically utilize different cabling systems, different bandwidths and typically transmit data at different speeds. In addition, each of the different network types have different sets of standards, referred to as protocols, which set forth the rules for accessing the network and for communicating among the resources on the network.

However, many of the network types have similar characteristics. For the most part, digital data are usually transmitted over a network medium via frames (also referred to as "data frames" or "data packets") that can be of a fixed or a variable length. Typically, data frames have headers and footers on the two ends of the frame, and a data portion disposed in the middle. The specific layout of these data frames is typically specified by the "physical layer protocol" of the network being used. For example, the Ethernet physical layer protocol specifies that the structure of a data frame include a preamble field, a six-byte destination address field, a six-byte source address field, a two-byte type field, a data field having a variable size (46–1,500 bytes), and a four-byte error checking field. Other physical layer protocols will specify similar types of fame layouts.

As is well known, transmissions from one network connected device to another device are typically passed through a hierarchy of protocol layers. Each layer in one network connected device essentially carries on a conversation with a corresponding layer in another network connected device with which the communication is taking place and in accordance with a protocol defining the rules of communication.

For example, one well-known protocol standard is the Open Systems Interconnection (OSI) Model. OSI defines a seven-layer protocol model, which is widely used to describe and define how various vendors' products communicate. In that model, the highest network layer is the Application Layer. It is the level through which user applications access network services. The next layer is the Presentation Layer which translates data from the Application Layer into an intermediate format and provides data encryption and compression services. The next layer is referred to as the Session Layer, which allows two applications on different network connected devices to communicate by establishing a dialog control between the two devices that regulates which side transmits, when each side transmits, and for how long. The next layer, the Transport Layer, is responsible for error recognition and recovery, repackaging of long messages into small packages of information, and providing an acknowledgement of receipt. The next layer is the Network Layer, which addresses messages, determines the route along the network from the source to the destination computer, and manages traffic problems, such as switching, routing and controlling the congestion of data transmissions.

It is the next layer, referred to as the Data Link Layer, which packages raw bits into the logical structured data packets or data frames, referred to above. This would correspond, for example, to the Ethernet physical layer protocol noted above. This layer then sends the data frame from one network connected device to another. The lowest layer in the hierarchal model is the Physical Layer, which is responsible for transmitting bits from one network connected device to another by regulating the transmission of a stream of bits over a physical medium. This layer defines how the cable is attached to the network interface card within the network connected device and what transmission techniques are used to send data over the cable.

Thus, as a message is passed down through each of these respective layers, each layer may add protocol information to the message. Thus, the "data" present within the data payload of the data frame at the Data Link Layer (e.g., the Ethernet data frame) typically comprises a protocol stack comprised of multiple message packets. Each message packet has its own protocol format, and it may in turn be embedded within the data payload of another higher layer message, also having a different protocol.

As communication networks have increased in number and complexity, the networks have become more likely to develop a variety of problems, that are in turn more and more difficult to diagnose and solve. For example, network performance can suffer due to a variety of causes, such as the transmission of unnecessarily small frames of information, inefficient or incorrect routing of information, improper network configuration and superfluous network traffic, to name just a few. Such problems are compounded by the fact that many networks are continually changing and evolving due to growth, reconfiguration and introduction of new network typologies and protocols as well as new interconnection devices and software applications.

Consequently, diagnostic equipment, commonly referred to as "network protocol analyzers," have been developed for capturing, analyzing, and displaying information about data frames that are transmitted over a network. Typically, protocol analyzers are designed to identify, analyze and resolve interoperability and performance problems in different networks typologies and protocols. For example, the equipment enables users to perform a wide variety of network analysis tasks, such as counting errors, filtering frames, generating traffic and triggering alarms.

To do so, a protocol analyzer typically has the capability to capture all of the physical layer data frames (packets)

generated by other stations (nodes) on the network. The analyzer is then designed to evaluate the contents of each data frame and, preferably, display the contents along with a meaningful description, and preferably in the sequence in which they were captured from the network. The analysis data that can be displayed with each captured data frame can include a variety of information, including the time at which the packet was captured, the length of the packet, packet address information for one or more protocol layers, and a set of protocol decodes at each layer that the protocol analyzer is capable of decoding.

While protocol analyzers have proven to be extremely useful tools for debugging, testing and otherwise evaluating various operating characteristics of networks and network equipment, the implementation of such analyzers is difficult and previous approaches have not been entirely satisfactory. In particular, in order for the protocol analyzer to provide useful information for a given network, ideally it must be capable of interpreting each of the various—and sometimes numerous—protocols that are typically embedded within the physical layer data frame. The ability to perform this task is complicated greatly by the fact that today's communications networks utilize literally hundreds of different message protocols that may be present in any given data frame. As noted, a typical physical layer data frame on a network cable medium will have a data payload that is composed of multiple protocol layers. In fact, this "stacking" of message protocols within a physical layer data frame can often be more than five layers deep. Thus, today's protocol analyzer must be capable of interpreting and analyzing a myriad of different protocol types and combinations.

However, most protocol analyzers are specifically programmed to understand and interpret a finite number of protocol types, and thus are limited in their ability to fully analyze all networks. The problem is exacerbated by the fact that new protocols are continuously being developed and existing protocols modified and updated. Thus, it has been extremely difficult for protocol analyzers to support all existing protocols, and it is difficult to update existing protocol analyzers to support new and modified protocols.

Typically, protocol analyzers are configured to support particular protocols by way of customized software. Specifically, the protocol analyzer is a programmable device (or is operatively connected to a programmable master device, such as a personal computer) that is programmed with dedicated program code addressed specifically to the interpretation and analysis of a protocol type. If a new protocol capability is needed, or if the existing protocol is changed, then the source code for the program must be modified, updated or rewritten and then recompiled in order for the analyzer to support the new protocol. Obviously, this approach is terribly inefficient, and is costly and difficult to implement. Moreover, it requires a high degree of programming skill, as well as detailed knowledge of the network protocols.

Thus, there is a need in the art to provide an efficient and easy method for defining a protocol for use by a protocol analyzer. It would be desirable if the approach does not require the creating and use of a specific computer program to define the protocol. In particular, the methodology should not require the need for advanced programming skills, and should be capable of easily updating or modifying a protocol description. Also, it would be desirable if the protocol description was not limited to being used on any particular device type, and that is instead portable from one device to another. Further, it would be an advancement if the protocol description could be accomplished in a manner such that it could be easily used for applications other than protocol analyzers. These and other needs are addressed by embodiments of the present invention.

BRIEF SUMMARY OF EMBODIMENTS OF THE INVENTION

These and other problems in the prior art are addressed by embodiments of the present invention, which relate to a system and method for describing the content of a data frame captured on a communications network. The description is provided in a high level, easy to understand format. Importantly, the methodology utilized by preferred embodiments of the invention utilizes a "protocol definition" that can be applied to data frames of any physical layer protocols, such as Ethernet, Fibre Channel, InfiniBand or others. Moreover, the protocol definition allows for all of the protocol stacks that may be contained within the physical data frame to also be identified and also described in an understandable format. Also, in direct contrast to existing methods for describing the content of data frames, the present approach does not require the need for customized and dedicated computer software programs to describe a particular frame protocol. Similarly, embodiments of the present invention are not "hardware specific"—that is, the protocol definition is provided in a manner that can be used in any network equipment device, such as protocol analyzers. Also, while the protocol definition approach finds particular applicability when used within the context of a protocol analyzer device, it can be used in the context of practically any other application that is based upon an understanding of the contents of a physical layer data frame.

In general, embodiments of the present invention utilize a unique set of "definition constructs" that are used to describe the relevant characteristics of a given physical layer protocol. In addition, the definition constructs also provide the ability to describe the various higher level protocols that may be included within the data frame. The unique character of the constructs also provide the ability to identify multiple stacks of protocol layers within the data frame.

In practice, a user would define the data frame of a given physical layer protocol, as well as all of the higher level protocol permutations, using the definition constructs. The set of definition constructs would then be saved as a "protocol definition file," which can then be saved within the protocol database of a protocol analyzer, for example. The protocol analyzer, which is operatively connected to a network having the physical layer protocol previously defined, would then utilize the protocol definition file to interpret captured data packets. In particular, each captured data frame is interpreted in accordance with the definitions provided by the definition constructs. In addition, a user understandable view of the captured frame can then be displayed to the user, preferably via a video display. Again, the view would be displayed in a format that includes information prescribed by the constructs of the protocol definition file.

In presently preferred embodiments, the individual definition constructs that make up a protocol definition file are constructed utilizing a protocol editor. Preferably, the protocol editor includes a graphical interface as a front-end, which allows a user to assemble the necessary constructs without having any need for detailed knowledge of the format and layout of the constructs themselves.

When used in a protocol analyzer environment, once a data frame has been captured, and interpreted based on a corresponding protocol definition file, the interpretation is displayed for the user. While many display formats could be used, in a preferred embodiment, a graphical interface environment—similar to that used by the protocol editor—is used. Preferably, a number of display options are available, allowing the user to select as much, or as little, frame detail as needed.

The foregoing, together with other features and advantages of the present invention, will become more apparent when referred to the following specification, claims and accompanying drawings.

BRIEF DESCRIPTION OF THE DRAWINGS

The appended drawings contain figures of a preferred embodiment of the present invention. The above-mentioned features of the invention, as well as other features, will be described in connection with the preferred embodiment. However, the illustrated embodiment is only intended to illustrate the invention and not limit the invention. The drawings contain the following figures.

DETAILED DESCRIPTION OF PREFERRED EMBODIMENTS

I. Introduction

Figure 1:
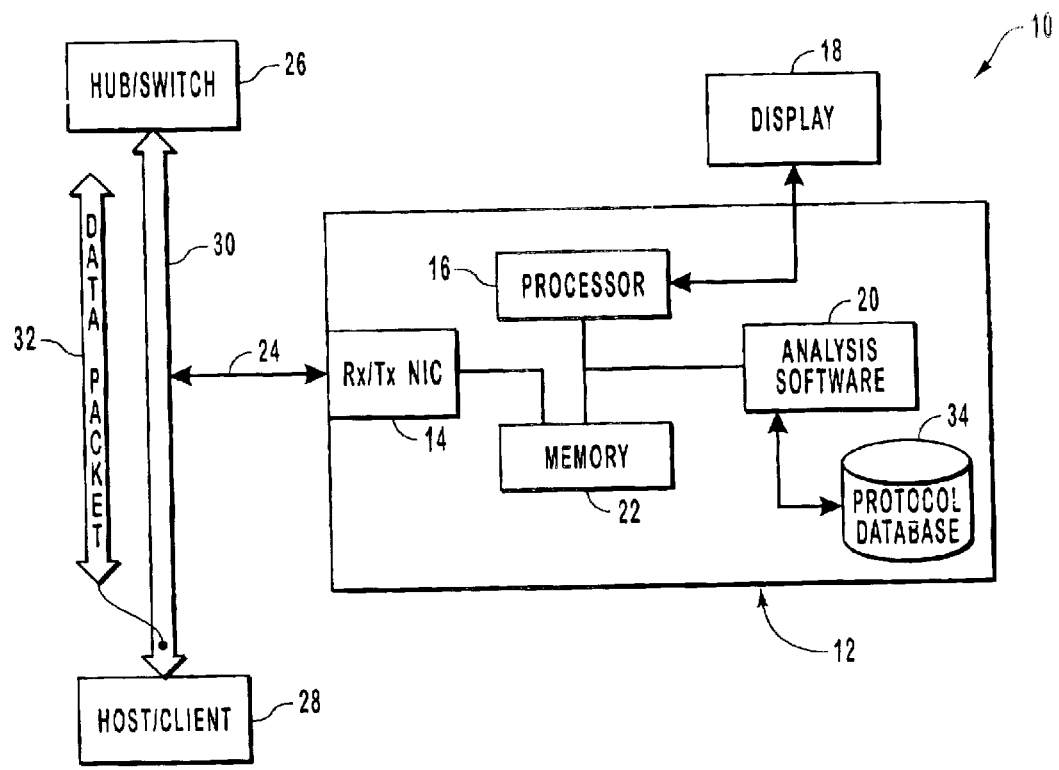
FIG. 1 illustrates one presently preferred embodiment of an overall protocol analyzer system for analyzing data frames in accordance with protocol definition constructs.

Reference will now be made to the drawings to describe presently preferred embodiments of the invention. It is to be understood that the drawings are diagrammatic and schematic representations of the presently preferred embodiments, and are not limiting of the present invention, nor are they necessarily drawn to scale.

To assist in the organization of the detailed description and to aid the reader, the following detailed description is divided into sections that have descriptive titles to indicate the general nature of the information that follows. The section titles are not intended to indicate that information suggested by any one section title is not contained in any other section, nor should the titles be construed as limiting of the general nature of the invention.

Also, portions of the following description of presently preferred embodiments is illustrated by way of reference to an Ethernet network topology and the Ethernet physical layer protocol. However, limiting examples to this environment is intended only to provide consistency in order to facilitate understanding of the present invention, and it is not meant to indicate a limitation of the suitability of the present invention to other network environments and network protocols. Indeed, as will be readily apparent to one of skill in the art, the teachings of the present invention are equally applicable to the analysis of practically any network data frame and protocol, either currently existing or that are yet to be developed. Examples include, but are not limited to network protocols such as: Fibre Channel, Fiber Distributed Data Interface (FDDI), InfiniBand, etc.

II. Overview of the Preferred Embodiments

Embodiments of the present invention include functions that may be implemented in computer hardware, computer software or a combination of both hardware and software. However, in one presently preferred embodiment, the functionality is implemented with a combination of computer hardware and software.

A. Software Embodiments Overview

Certain aspects of presently preferred embodiments are implemented by way of computer executable instructions (computer software) executing within an appropriate computing environment. Software implemented aspects of the present invention preferably provide several functions. First, a data frame analysis methodology is disclosed, which includes the ability to ascertain the characteristics of the contents of a data frame captured on the network, and then display relevant information about the data frame. The data frame can be formatted in accordance with any given physical layer protocol, such as Ethernet, Fiber Channel, InfiniBand, etc., and may also be composed of multiple other protocol layers (i.e., Internet Protocol—IP, Address Resolution Protocol—ARP, Transmission Control Protocol—TCP, and many others). The analysis of the frame contents is accomplished with a collection of "definition constructs." One example of suitable definition constructs is described in further detail below at subsection V(A). These constructs generically "define" the characteristics of a data frame for a given physical layer protocol. Moreover, in preferred embodiments, the constructs describe the characteristics of the various protocol layers that may be carried by the data frame, as well as the permutations and relationships between those various protocol layers.

In addition to providing a blueprint of the possible contents of a frame, the definition constructs also preferably provide understandable descriptions of the various aspects of the frame itself, and of the higher level protocols that can be carried within the frame. These descriptions can then be used to provide an understandable description of the data frame and its contents when it is displayed to a user.

In a presently preferred embodiment, this collection of constructs is stored as a "protocol definition file," which can then be used, for example, by a protocol analyzer—although other applications could use the file. When a network data frame is captured by the protocol analyzer, it is evaluated based upon this protocol definition file and, using the definition constructs contained therein, is described in an understandable format—including each of the higher level protocols that are contained within the data frame. As will be shown, a protocol definition file can be created for the data frames of any given physical layer protocol, along with all of the various higher level protocol messages that may be contained within the physical layer data frame. The definition file can then be stored, for example, within a protocol database. The appropriate protocol definition file can then be used by a protocol analyzer, or similar device, to analyze the data frames of a network complying with the loaded definition file. Definition files can be created for new protocols, and/or can be easily updated when a protocol is modified—all using the same definition constructs. Moreover, the definition files are not "machine" or "application" specific; that is, the protocol definition file can be used by any device/application needing to evaluate the content of a network data frame, or that needs to perform any operations dependent on the frame content. For example, applications such as searching for the occurrence of a particular frame type, or filtering of frames having specific characteristics could utilize the protocol definition file.

While the protocol definition file can be built merely by assembling the necessary definition constructs manually, in preferred embodiments, another software function provides a protocol editor function to create the appropriate constructs. Preferably, this protocol editor is implemented with a graphical user interface (GUI). This GUI allows the user to build the protocol definition file via an easy-to-understand graphics interface, thereby allowing a user to define the protocol in a manner that does not require a detailed knowledge of the format of the definition constructs. Instead, the user simply defines the protocol by interacting with the software implementing the front-end graphical interface by selecting appropriate fields, options and entering appropriate information. The protocol editor then builds the definition file using the appropriate syntax and definition constructs.

Yet another software-based aspect of a presently preferred embodiment provides the ability to display the results of a network protocol analysis, also preferably via a graphical user interface. The user interface is extremely flexible in that it allows the user to easily select what characteristics of the captured data frame should be displayed.

B. Hardware Embodiments Overview

In general, it will be appreciated that the preferred software environment addressed above is not limited to any particular hardware environment, nor must the software be used in connection with any one particular application. Indeed, as was noted, the protocol definition file can be used for any one of a number of applications where the content of a physical layer data frame is analyzed or otherwise acted upon, including frame protocol analysis, filtering, searching, etc.

By way of example and not limitation, in one presently preferred embodiment the software is described as being used in connection with a protocol analyzer type of device. It will be appreciated that this hardware functionality could be implemented entirely within a dedicated personal computer, such as a general purpose desktop or laptop personal computer (PC), or could be implemented within a dedicated protocol analyzer instrument having the appropriate processing capabilities. Or, as is the case in the preferred embodiment, the hardware functionality could be implemented with a combination of the two environments; that is, a portion of the function is provided within a dedicated protocol analyzer device, which is then operably connected to, and controlled by, a separate general purpose personal computer (PC).

Thus, the first primary function of the hardware in a preferred embodiment is to provide the physical computing platform for execution of the software portion of the invention. Secondly, the hardware platform provides the ability to electrically and physically interface with the network that is being monitored. In addition, the hardware preferably provides the ability to physically display the graphical user interface, such as a video display device (e.g., a standard cathode-ray tube monitor or liquid crystal display) and that provides the user with the ability to interact with the GUI, such as by way of common input devices such as a keyboard and a mouse. Various aspects of presently preferred hardware implementations will be described in further detail below.

C. System Overview

Referring now to FIG. 1, an overall system view of one presently preferred embodiment is generally designated at 10. In this particular embodiment, the system environment is centered on a network protocol analyzer device, which is designated generally at 12. As is well known, a protocol analyzer has a primary function of capturing, analyzing and displaying information about packets that are transmitted over a network. In the illustrated embodiment, the protocol analyzer 12 is shown as being operatively connected to a simplified communications network, designated generally at 30. For purposes of illustration, FIG. 1 depicts several network devices connected to the network, including a hub/switch 26 and a host/client 28. It will be appreciated that in a typical network environment, additional types of network devices would also be interconnected by way of the network 30.

FIG. 1 also depicts the presence of physical layer data packets, such as is depicted at 32, being transmitted over the network between the network-connected devices. The format of this data packet (also sometimes referred to as a "data frame" or a "network packet") will depend on the physical layer protocol being used, and it will be appreciated that the teachings of the present invention are applicable to any one of a number of protocol types. However, for purposes of illustration, the present invention will be described with respect to the physical layer protocol defined by the Ethernet standard (IEEE 802.3).

The protocol analyzer device 12 illustrated in FIG. 1 also includes a network interface card (NIC) 14 that allows for the physical and electrical interconnection with the network 30, as is depicted schematically at 24. Again, the type of network interface card used will depend on the physical layer protocol of the corresponding network 30. For an Ethernet network, the NIC 14 is an Ethernet network interface card. Also, the network interface card 14 is configured so as to be operated in a promiscuous mode, such that it is able to capture all packets traversing the network 30. As is well known, the interface card 14 actually captures serial data bits from the network medium, and then assembles the data into the separate data frames in accordance with the relevant physical layer protocol.

Included within the protocol analyzer device 12 is an appropriate CPU or processor 16 and conventional internal memory 22, which are interconnected by a system bus in a manner well known in the art. Also, there is a suitable computer storage location, such as a magnetic storage medium, that contains the packet analysis software module, designed at 20. During execution this software would typically be loaded into memory 22 for execution on the processor 16. As will be described in further detail below, this packet analysis software provides the function of interpreting the contents of a captured frame based upon the contents of a protocol definition file. It could also include, for example, the protocol editor function summarized above, and optionally the graphical user interface software for allowing a user to interact with the editor. Also included within a suitable memory location, such as a magnetic disk, is a protocol database storage location 34. This storage location would include the particular protocol definition file, summarized above, the "defines" the format packets traversing the network 30—in this case, the Ethernet physical layer packet. Also included with the protocol analyzer 12 is an appropriate computer display 18 device, such as a cathode ray tube or liquid crystal display, for providing the necessary display capabilities for viewing the results of the packet analysis. Also, the device 12 includes any suitable input devices, such as a keyboard and a mouse device (not shown).

It will be appreciated that FIG. 1 is for illustration purposes only, and should not be viewed as limiting the teachings of the present invention. First, protocol analyzer 12 could be implemented as a dedicated network analyzer device and as a single "self-contained" unit. Alternatively, the device could be implemented exclusively within a general purpose personal computer (PC), such as a laptop computer having an appropriately configured NI module 14. Or, the device 12 could be implemented with a "stand-alone" network analyzer portion that connects to, and is controlled by, a general purpose PC, such as a laptop computer. With this approach, the analyzer portion would provide the physical interconnection to the network, and would provide some of the processing power for the analysis software. The PC would "control" the analyzer, and would provide some the graphic display, and well as the input capability. Moreover, the PC would be used to store captured information, and would include the protocol editor and protocol database a functionality. The present invention can be implemented via any one of these implementation approaches.

III. Data Frame Content

Figure 2:
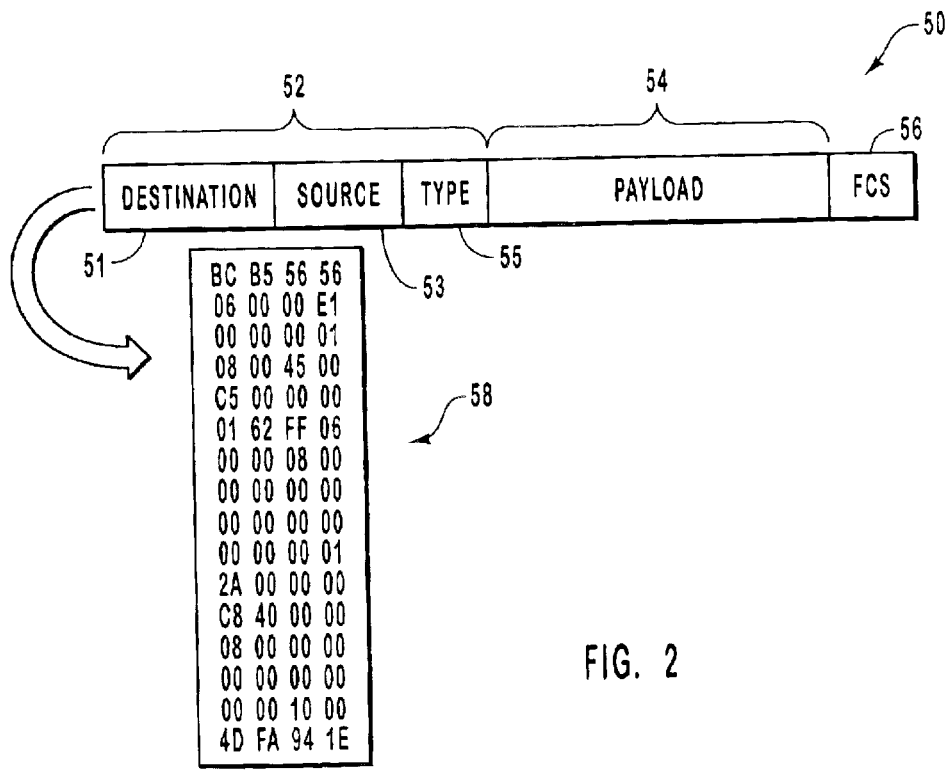
FIG. 2 illustrates a data frame and its physical layer protocol attributes.

Referring next to FIG. 2, one example of the format of a network data frame is described. Illustrated is the layout of a single data frame, which is designated generally at 50. Again, while the teachings of the present invention can be used for the analysis of most any physical layer frame-type, for purposes of illustration, the illustrated frame 50 is structured in accordance with the format specified by the Ethernet physical layer protocol. The Ethernet data frame begins with an 8-byte preamble field (which is not shown in this illustration), which is used for synchronization purposes. This preamble is followed by a "destination address" field 51, which designates the unique address of the network connected device that is to receive the data frame. Next is the "source address" field 53, which designates the unique address of the device that sent the data frame. Each of these address fields contain the Medium Access Control ("MAC") addresses of the source and destination devices on the network 30. The MAC address is a unique address hardwired into the station's network interface card, such as that shown at 14 in FIG. 1. For the Ethernet protocol, each address is 6 bytes (48-bits) in length.

Following the source address is the Type Field 55 (sometimes referred to as the "Ethertype"), which is a 2 byte field that includes a value that specifies what higher layer protocol (if any) is present within the following data field, or "payload," that is designated at 54. The destination and source address fields and the Type field 55 are collectively referred to as the "Ethernet Frame Header" 52.

The Ethernet payload 54 is a variable sized field that ranges anywhere from 46 to 1,500 bytes. It can contain any one of a number of higher level protocol messages (i.e., that correspond to the higher levels of the 7-layer stack model), as well as the actual "data" that is being transmitted via the data packet 50. In fact, there can be a "stacking" of different protocol messages contained within the Ethernet data frame that can easily exceed five layers. The last field is a 4 byte frame sequence ("FCS") 56, which is used for error detection.

As is well known, the content of the Ethernet data frame is derived from a serial stream of digital ones and zeroes that are electronically (or optically, depending on the network medium used) represented on the network physical medium. These ones and zeroes are captured and separated into the discrete packets of the sort illustrated at 50 in FIG. 2. Typically, the packet contents are represented in a hexadecimal format, similar to what is shown in the box 58 of FIG. 2. It will be appreciated that this sort of data is not easily understood for a human user when debugging a network. Moreover, as noted, the Ethernet data frame can also include many layers of other protocol messages. Consequently, it is desirable for this information content to be translated into a higher level, user understandable format, so as to provide a useful set of information for analysis of the network.

IV. Data Flow and General Process Overview

Figure 3A:
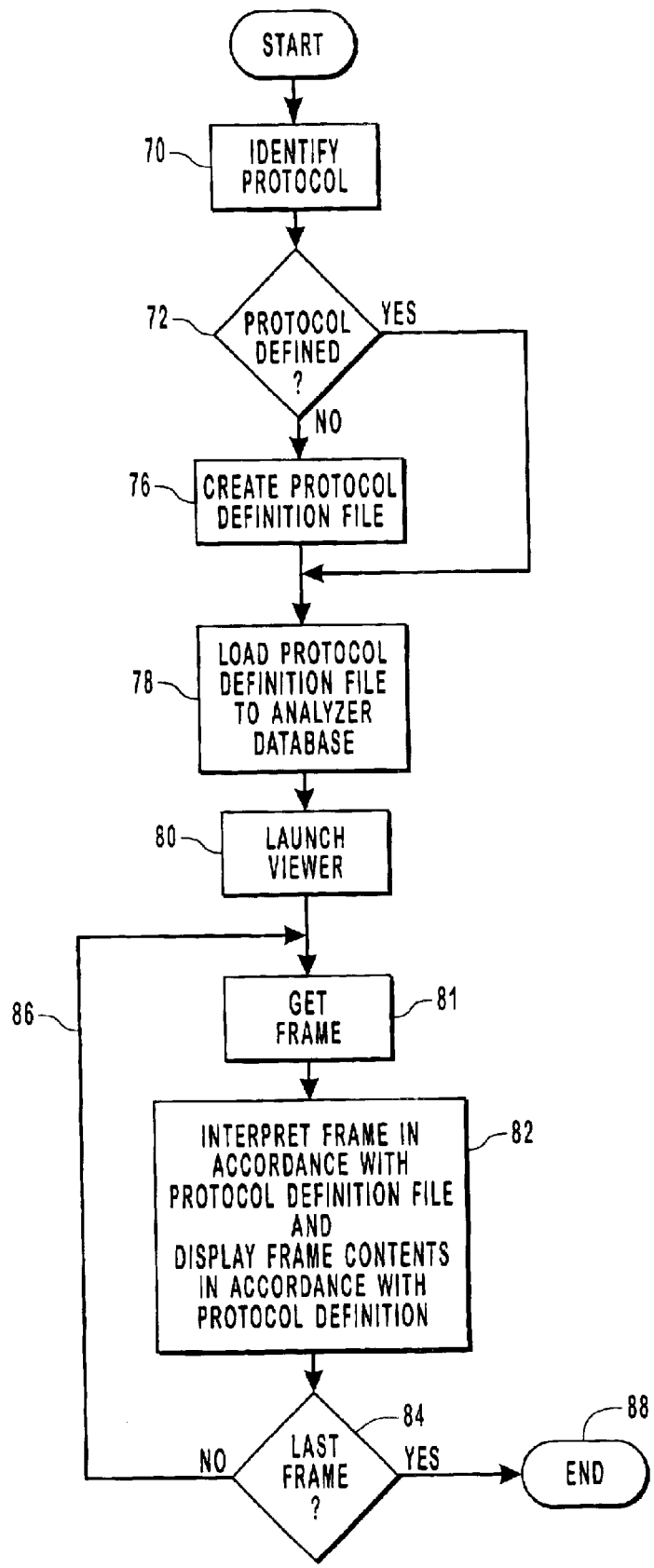
FIGS. 3A and 3B illustrate a program flow chart that describes one presently preferred set of program steps for implementing one presently preferred embodiment of the invention.
Figure 3B:
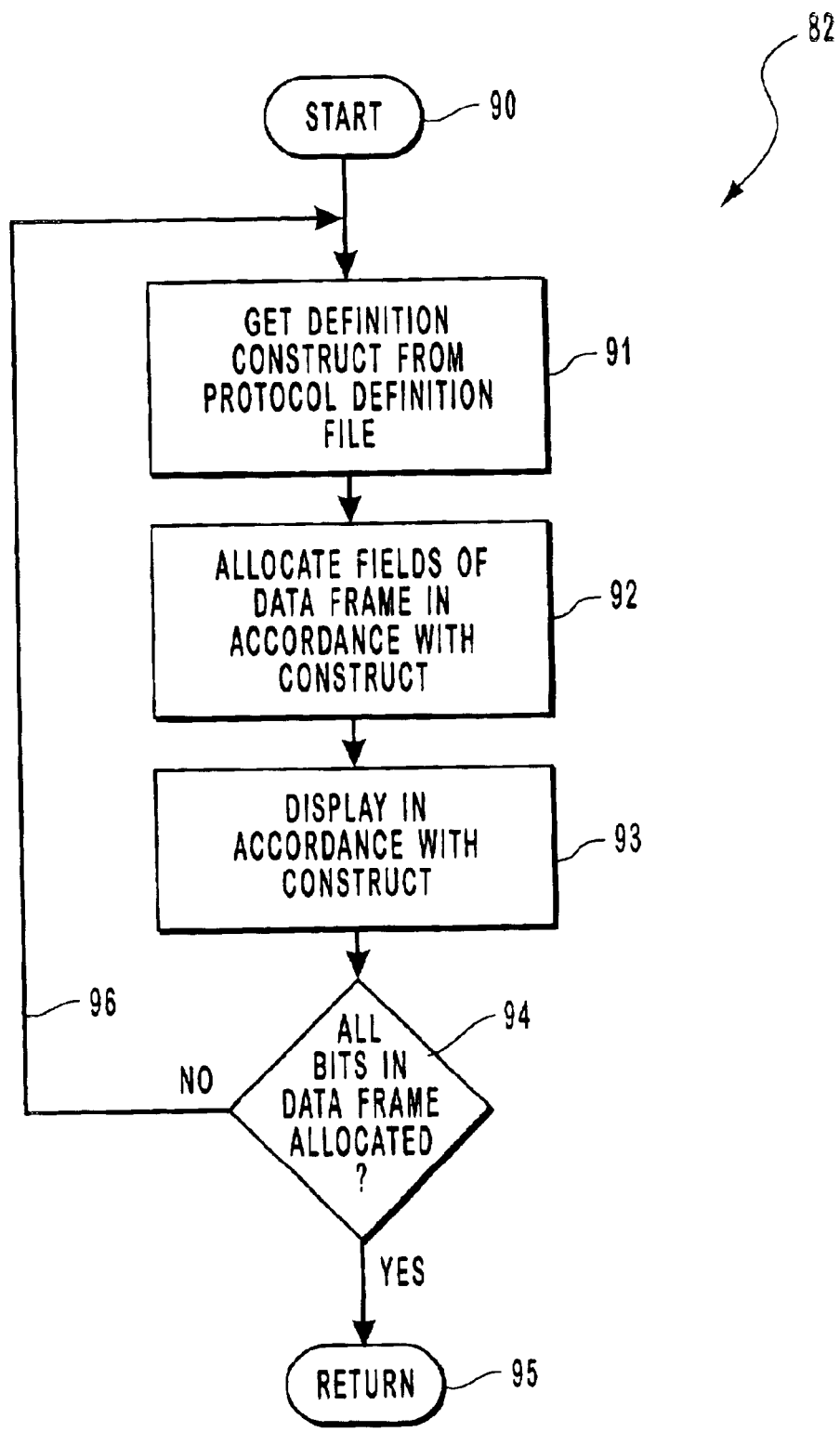
Figure 4:
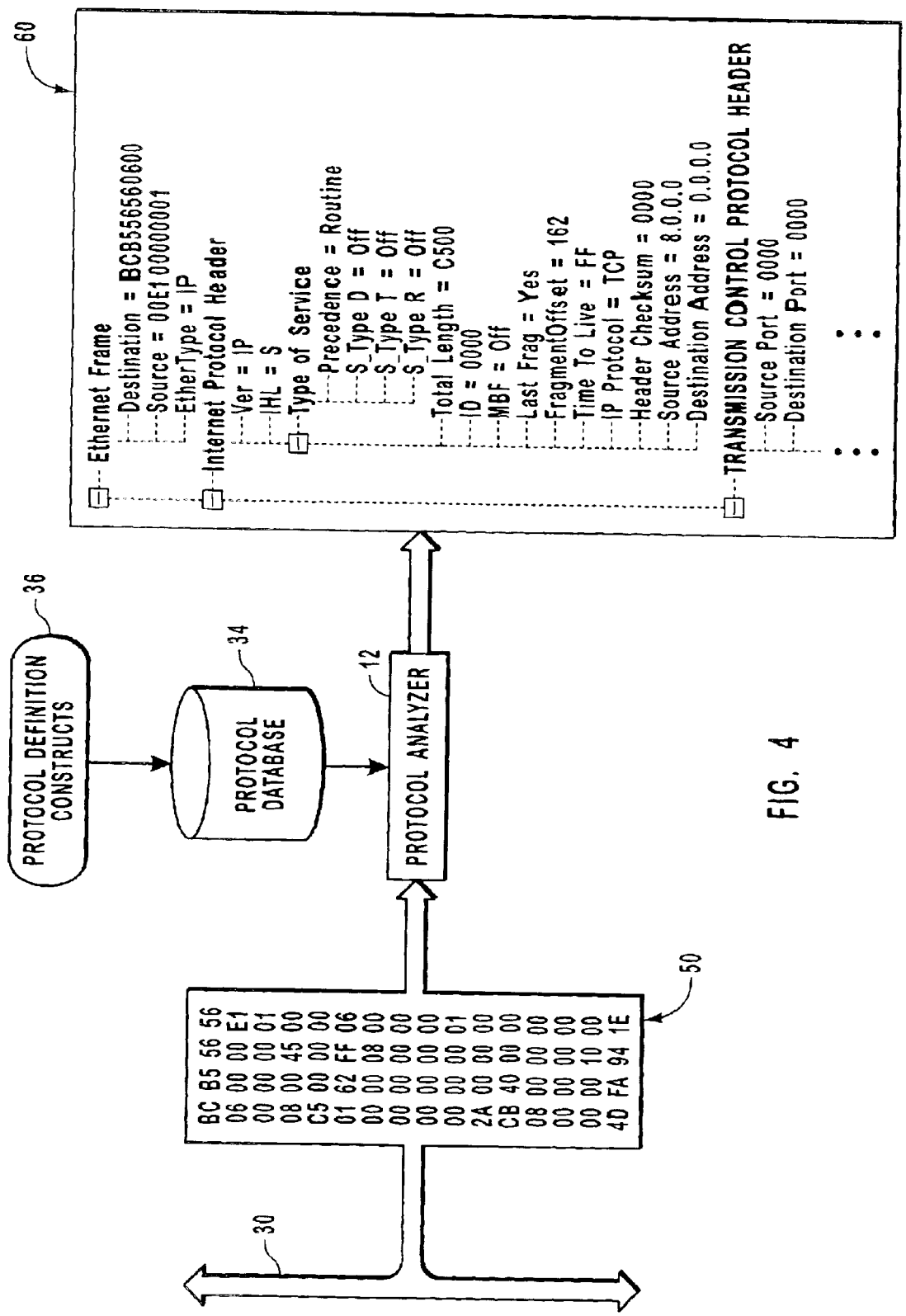
FIG. 4 is a functional block diagram illustrating the data flow in one presently preferred embodiment of the invention.

Reference is next made to FIGS. 3A, 3B and 4 together, which together provide an overview of the general flow of information, along with the corresponding general processing steps used in one presently preferred embodiment of the invention. In particular, FIGS. 3A and 3B illustrate a high level flow chart that illustrates an example of the series of functional steps that would be programmed as computer executable code in a protocol analyzer device 12 to analyze frame contents. FIG. 4 is a corresponding functional diagram, illustrating the general flow of information through the system in one presently preferred embodiment.

Referring first to FIG. 3A, the process begins at step 70 by identifying the relevant physical layer protocol. Typically, this information would be communicated by the network interface module 14 portion of the network analyzer 12, which is electrically and physically connected to the physical medium of the network being analyzed (30 in FIG. 1). Once the physical layer protocol is identified, the analyzer 12 could, at functional step 72, ascertain whether a corresponding protocol definition already exists for the identified protocol. If so, processing would proceed, as is indicated schematically at line 74, at program step 78. At this point, the relevant protocol definition file would be loaded into the protocol database 34 (FIG. 4) for use by the analyzer 12.

If, however, at step 72 it is determined that a protocol definition file for the identified protocol does not already exist, then processing would proceed at program step 76. This step corresponds to the series of steps associated with the creation of a new protocol definition file for the identified protocol. In presently preferred embodiments, this involves the use of an appropriate protocol editor, implemented functionally at 36 in FIG. 4. As noted above, the protocol editor is used to prepare a series of predefined protocol definition constructs that can be used to preferably accomplish several objectives. First, the constructs provide the ability to define the data frame corresponding to the relevant physical layer protocol, such as the components of the frame header, etc. Second, the constructs preferably provide high level descriptions that can be displayed to a user to describe the various fields of the frame and its contents. Third, the constructs provide a means for identifying and describing the various protocol layer messages that are contained within the payload of physical layer data frame, as well as the relationships between these various protocol layers—again, in a manner that is descriptive to a human user. While any suitable series of constructs can be used, Section V(A).

below provides a description of one presently preferred set of constructs that can be used to define a given protocol. Also, while the constructs can be assembled with any suitable method—including a simple text editor—in a preferred embodiment, the protocol editor allows a user to build the protocol definition file with appropriate constructs by manipulating fields and options via a graphical user interface, which is described further at Section V(B) below.

Figure 12:
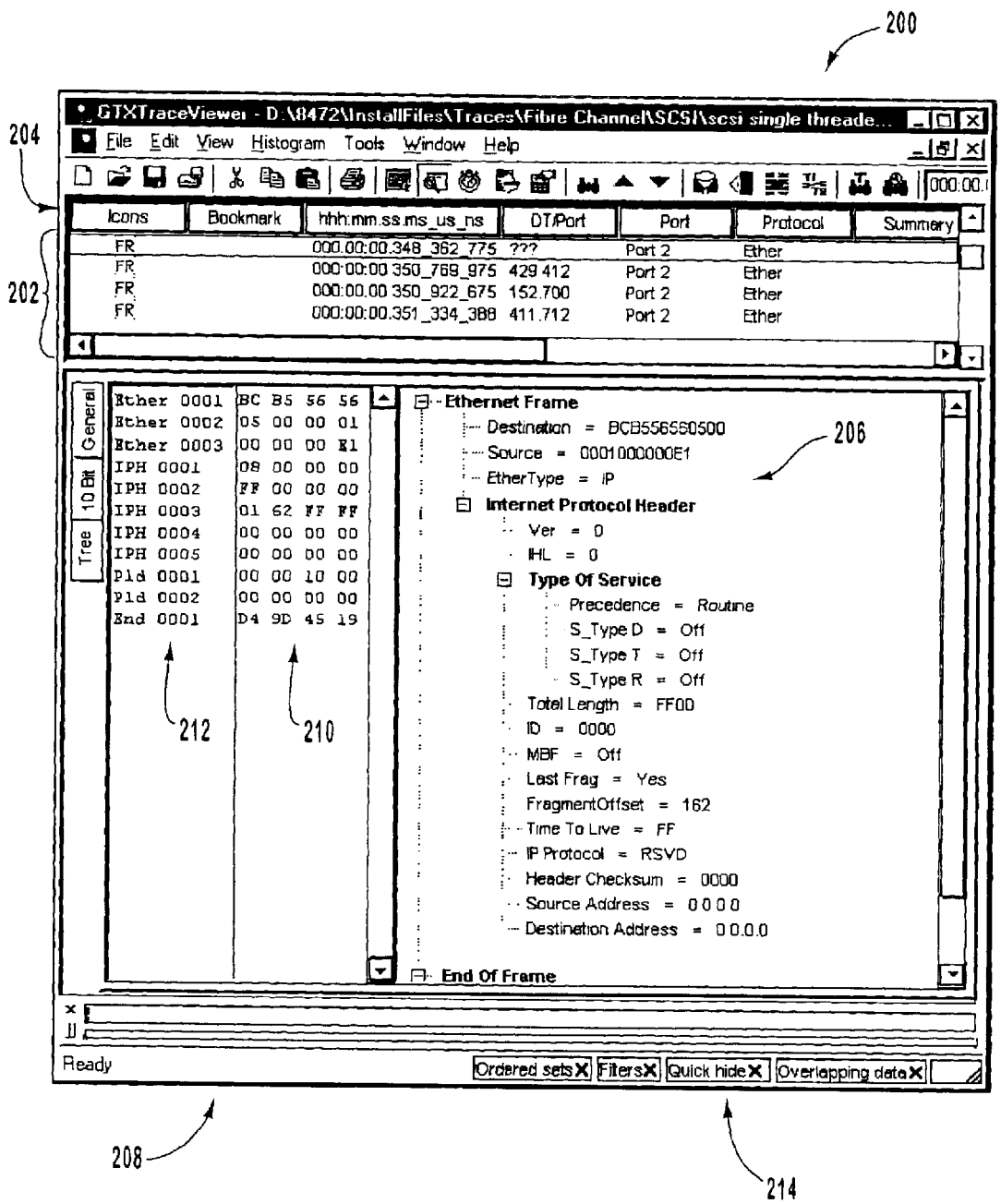
FIG. 12 illustrates an example of a graphical user interface for displaying the results of an interpreted frame.

Once an appropriate protocol definition file is provided, it is loaded into the protocol database 34, as indicated at step 78 in FIG. 3 and as is functionally denoted in FIG. 4. The protocol analyzer 12 will then cause an appropriate viewer to be displayed on a computer display (e.g., 18 in FIG. 1). The viewer will provide a defined viewing area for displaying frame contents and descriptions to the user. Again, while this viewing area can take any one of a number of forms, in a preferred embodiment it is provided as a graphical interface on the computer display 18. One example is shown at FIG. 12, which will be described in further detail below.

At program step 81, the network analyzer 12 obtains a data frame from the network 30. As is well know, this functionality is provided by way of the network interface module 14, which obtains serial data from the physical medium of the network 30, and segments the data into data frames in accordance with the particular physical layer protocol of the interface module 14. The frame is typically provided to the logic of the protocol analyzer 12 via a memory buffer (such as at 22 in FIG. 1). FIG. 4 depicts one example of a Ethernet physical layer data frame, designated at 50, along with an illustration of its numeric contents in hexadecimal format.

Processing then continues at program step 82. Here, the analyzer interprets the frame in accordance with the contents of the protocol definition file previously defined and stored in the protocol data base 34. In addition, the frame's contents are displayed in the manner prescribed by the protocol definition file, including, preferably, with some type of description using a higher-level, user understandable format. An example of the type of information that can be displayed is indicated in the display area 60 of FIG. 4, as well as in FIG. 12. For example, a suitable display may include descriptive language for the "Destination" address, the "Source" Address, the type of protocol (IP) specified in the "EtherType" field, and so on. Also, in preferred embodiments, the system allows the user to graphically select the type and extent of information that is displayed for a selected frame. The manner in which the frame is interpreted, and its contents displayed, will depend on the type of constructs used, and the particular protocol involved. One example of the program steps used to implement the function of program block 82 is shown in FIG. 3B, to which reference is now made.

The set of program steps in FIG. 3B are one example of the actions performed to interpret the contents of the current data frame, and to display the contents and/or related descriptive information about the frame. Thus, processing will begin at functional step 91, which corresponds to a series of program steps in which a definition construct is obtained from the protocol definition file. In preferred embodiments, the first construct that will be used at this step will depend on the particular physical layer protocol involved. Once the appropriate definition construct is obtained, processing proceeds at program step 92, where the various fields of the data frame are allocated in accordance with the requirements of the construct. Thus, for example, the construct may specify that a number of the bytes within the frame be designated as a destination address, another portion of the bytes designated as a source address, and yet another portion of the bytes allocated as a type field, and so on. Of course, the actual allocation is dependent entirely on the requirements of the construct: Also, it will be appreciated that this step may involve the application of multiple constructs—again depending on the requirements of the first construct. Processing continues as program step 93 where the contents of the data frame and/or other descriptive information are displayed in accordance with the requirements of the construct (or constructs). For example, the source address and the destination address just described may be displayed along with descriptive language such as "destination" and "source." At this point, the interpreted frame contents will preferably be displayed in accordance with the graphical user interface, one example of which is shown in FIG. 12, and described in further detail below. Processing will continue, as is indicated by the decision block at 94 until such point that all the bits within the data frame have been allocated by the constructs. Once the entire data frame has been analyzed, processing will return to the main program illustrated in FIG. 3A.

Processing continues for each data frame captured by the protocol analyzer 12 as is indicated by the program loop 86 in FIG. 3A. Once the last frame has been captured, processing is stopped, as is indicated at program steps 84 and 88.

Note that the above processing steps constitute only one example of how the present invention could be implemented. It is not meant to imply that this exact processing flow must be followed, or that all of the steps must be performed. Indeed, this example is directed to the processing steps that may be performed in a protocol analyzer application. It will be appreciated that the protocol definition file could be used for a number of other applications as well, which would require a different process flow. For example, the protocol definition file could be used to filter frames on a network, or could be used to search for the occurrence of a data frame having specific characteristics as defined by way of the protocol definition file.

V. "Definition Constructs" For Protocol Definition

As noted, presently preferred embodiments of the present invention utilize a set of predefined protocol "definition constructs" to describe a given physical layer protocol, as well as any higher level message protocols that may be transported by the physical layer data frame. While other similar approaches could be used, following is a description of a presently preferred set of definition construct-types, and their use in defining a given protocol. Also, a description of one presently preferred implementation of a protocol editor, which uses a graphical interface, is described.

A. Protocol Definition Constructs

In a presently preferred embodiment, the protocol definition file for a given physical layer protocol is built using a set of predefined definition constructs. These constructs provide a means for generically describing the format of a physical layer data frame, as well as the various protocols that may be embedded within the data frame. In addition, the definition constructs provide a higher level description for various aspects of the data frame, so as to provide an understandable description of a captured frame when its contents are displayed. Once the description of a given protocol is complete, in the preferred embodiment the definition is saved as a file in a protocol database, and can then be used by the protocol analyzer (or other application requiring such data frame descriptors) to interpret captured data frames and display meaningful descriptions of the frame contents.

While other constructs could be utilized, in a preferred embodiment, data frames for a given protocol are defined via six "base" constructs, referred to as: (1) Structures; (2) Fields; (3) Interpretations; (4) Padding; (5) Alternatives; and (6) Arrays. In addition, in a preferred embodiment, two additional "advanced" constructs are used, which are: (7) Switches; and (8) Groups.

Use of these eight definitions provides the ability to describe any data frame for any physical layer protocol, such as Ethernet, Fibre Channel and InfiniBand. In addition, the constructs provide the ability to decode and describe the upper layer protocols and the relationships between each protocol layer, that are contained within the physical layer data frame. In general, the constructs can be used to describe the different structures and fields of a data frame based on the characteristics of the frame protocol, and can decode the various protocols carried by the frame based on certain field values contained within the frame. Importantly, certain of the constructs provide the ability to describe the relationships between the various protocol layers that are typically embedded within a physical layer data frame. In addition, for those situations where it is not possible to ascertain the format/content of a particular protocol message contained in the data frame, the constructs provide the ability to ascertain the format based upon the context of the transaction within which the data frame has been captured. This approach allows for the identification of otherwise ambiguous protocol messages.

In presently preferred embodiments, each of the constructs have various features and specific attributes with respect to the manner in which it describes a data frame. Following is an overview of each of the separate constructs, as they are implemented in one presently preferred embodiment. For purposes of illustration, examples will be made with respect to an Ethernet physical layer data frame, such as the example frame illustrated in FIGS. 2 and 3. Also, reference will be made to FIG. 5, which graphically illustrates the relationships between the various base constructs in a presently preferred embodiment.

For ease of reference, an example of a protocol definition file, prepared using implementations of the following definition constructs, is attached hereto as Exhibit A. Note that this listing is for illustration purposes only, and should not be viewed as limiting of the present invention.

1. The "Structure" Construct

The Structure construct is the primary means for defining the content of a data frame for a given physical layer protocol. In the preferred embodiment, the Structure construct has several "attributes," which include: a short name; a long name; a bit length; and display flags. The short name provides a unique identifier for the construct; it can be used by other constructs to refer to the Structure construct. The long name is a more descriptive name, that can be used to provide a higher level description of the aspect of the data frame corresponding to the construct. The bit length specifies the bit length of the portion of the data frame to which the Structure construct pertains. The bit length can merely be a single value, an expression, or it can contain references to other constructs. Alternatively, the length can be left out completely, in which case it is implied that the length of the structure is equal to the sum of its child constructs' lengths (such as "fields" that make up the structure, described below). Or, the length may simply be "what is left in the data frame," ie., the sum of all the remaining consecutive bytes in the frame are allocated to the structure. The display flags are used to set the display characteristics of the structure, for a example, when the characteristics of the data frame are displayed by the protocol analyzer. For example, in a presently preferred embodiment, the display flags are composed of three options: "is visible," "display as root," and "display in index." Following is an example of Structure construct, which defines the Ethernet Frame Header portion of an Ethernet data Struct 111 Ether, Ethernet Frame, 112

In this example, "Ether" is the short name for the structure, and "Ethernet Frame" is the long descriptive name. The number 112 specifies that the Structure is 112 bits long. Finally, the bit pattern "111" specifies the display characteristics of the structure; in this case all three flag bits are set, implying each of the display options are enabled.

As is denoted in FIG. 5, a Structure construct can contain direct references to other Structure constructs, and/or to Field, Padding, Array or Alternatives constructs, each of which is described in further detail below.

2. The "Field" Construct

The Field construct provides the ability to further define the possible components of a data frame or an embedded protocol message. In a preferred embodiment, the attributes of a Field construct include: a short name; a long name; a bit length; and a display format. The short name, long name and bit length are similar those attributes of the Structure construct. The display format is merely a description that specifies the display format for the Field, including, for example, the following options: hexadecimal, decimal (little endien), decimal (big endien), float, ASCII string, Unicode string, IP address, and possibly others. For example, the Ethernet Frame header Structure construct defined above for the data frame of FIGS. 2 and 3 may contain direct references to a "destination," a "source" and an "EtherType" field, as follows:

Struct 111 Ether, Ethernet Frame, 112
    Destination
    Source
    EtherType

Each of these fields could then be described with the Field construct as follows:

Field, Destination, Destination Node Address, "%x", 48
Field, Source, Source Node Address, "%x", 48
Field, EtherType, Higher Layer Protocol Type, "%x", 16

Thus, the first Field construct defines a short name of "Destination" and a long name of "Destination Node Address" The %x designation indicates a print-style display format having a hexadecimal representation, and the value "48" is the length field, indicating that the length is of the Destination Node Address in the data frame is 48 bits.

As is denoted in FIG. 5, a Field construct can contain direct references to an Interpretation construct, discussed in further detail below.

3. The Interpretation Construct

In the preferred embodiment, one of the definition constructs is referred to as the "Interpretation" construct. In preferred embodiments, this construct is referred to only by a Field construct. More particularly, it is used for those Field constructs that may have more than one possible interpretation, based upon a value contained within a portion of the data frame that corresponds to the Field construct.

Continuing with the above example, the "EtherType" field of the Ethernet data frame can have multiple interpretations, depending of the value of that field. For example, if the value contained within the EtherType field of the data frame is 0800 (hex), the interpretation is "IP," which indicates that higher layer protocol type contained within the Ethernet payload is an IP message. Conversely, if the value contained within the field is hex 0806, then the interpretation is "ARP" indicating that the higher level protocol type is address resolution protocol.

In preferred embodiments, the attributes of the Interpretation construct include: a matching value; a short interpretation; and a long interpretation. The matching values in Interpretation constructs can be expressed in a hexadecimal format. Also, "don't care" nibbles can be used for the matching value attribute. For example, to specify that the range of values F000 to FFFF are interpreted as "Reserved" for the EtherType field, one could use FXXX as the matching value, implying that the value of the last three nibbles of the field does not matter; as long as F is the value of the first nibble, "Reserved" is the interpretation assigned. Also, it is possible to express matching values in binary format. Here, the convention is to use square brackets [ ] to identify the desired binary values. For example, [1000 1010] is equivalent to 8A in hexadecimal format. Also, "don't care" values can be used in binary format; [11XX] identifies a 4 bit value in which the first two bits must be 1, and the last two bits are "don't cares."

Following is an example of a Field construct (for the EtherType field) having multiple interpretations defined by Interpretation constructs:

Field, EtherType, Higher Layer Protocol Type, "%x", 16
  0600, Xerox XNS IDP, Xerox XNS IDP
  0800, IP, Internet Protocol
  0801, X.75 Internet, X.75 Internet
  0802, NBS Internet, NBS Internet
  0803, ECMA Internet, ECMA Internet
  0804, CHAOSnet, CHAOSnet
  0805, X.25 Level 3
  0806, ARP, Address Resolution Protocol
  601[00XX], 3Com Corporation, 3Com Corporation Again, this example shows how the Field "EtherType" will be interpreted differently based upon the value contained within its two-byte (16 bit) field in the captured data frame—as is specified by each of the subsequent Interpretation constructs.

Figure 5:
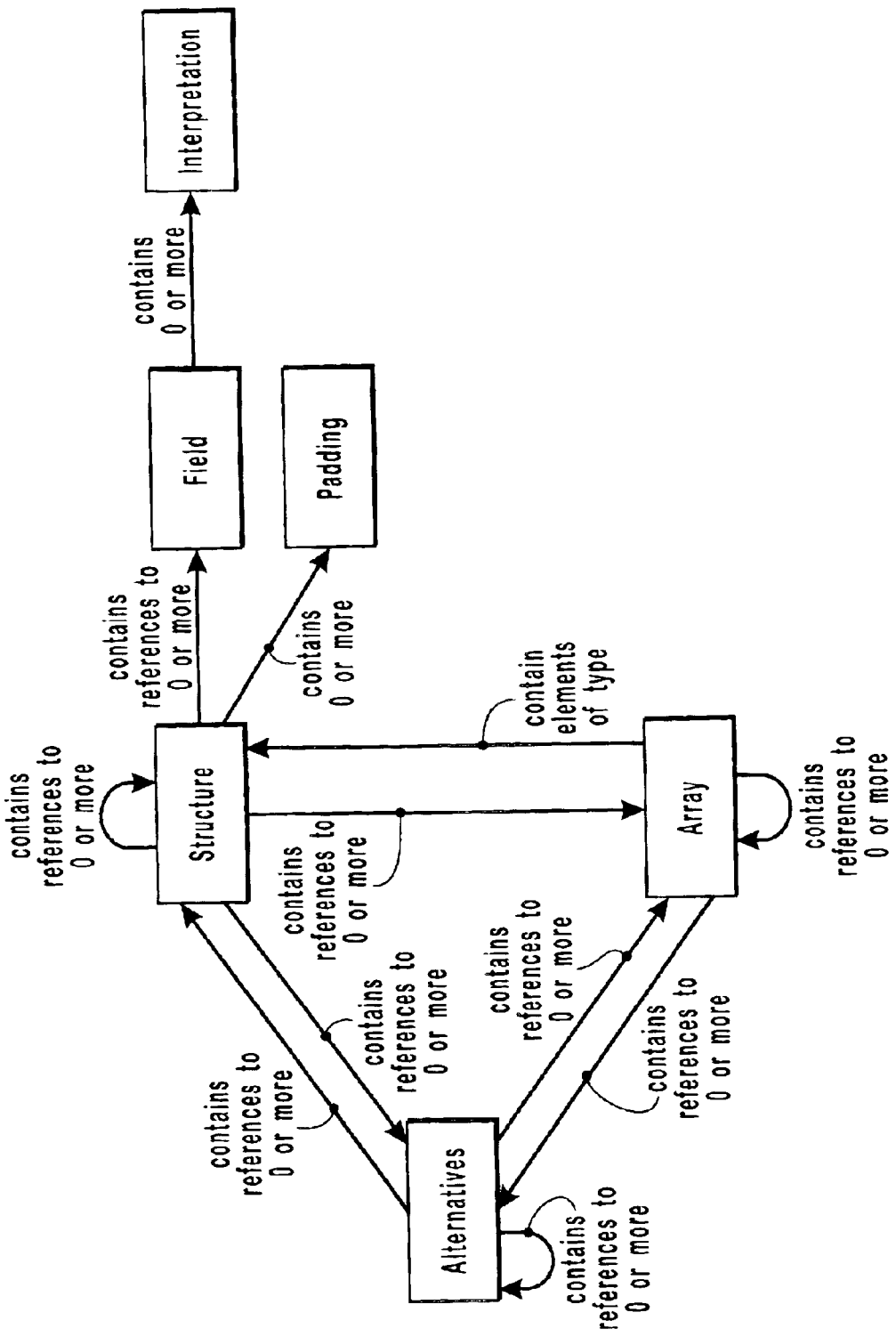
FIG. 5 illustrates the functional relationship between the definition constructs used in one presently preferred embodiment of the invention.

As can be seen in FIG. 5, in a presently preferred embodiment, an Interpretation construct does not contain references to any of the other constructs.

4. The Padding Construct

The Padding construct is equivalent to a Field construct without a short and a long name. It is used to identify any reserved bit(s) that may be present within the data frame, which can be present within certain protocols. As can be seen from FIG. 5, in a preferred embodiment, the Padding construct is only referred to by a Structure construct. Following is an example of a use of the Padding construct, used within the "Internet Protocol Header" Structure construct:

Struct 101, IPH, Internet Protocol Header, 160
  Ver
  IHL
  Type Of Service
  Total Length
  ID
  Offset 0
  MBF
  Last Frag
  FragmentOffset
  Time To Live
  IP Protocol
  Header Checksum
  Source Address
  Destination Address In this example, a Padding construct "Offset 1" is used to specify the presence of a single reserved bit between the "ID" field and the "MBF" field.

5. The Array Construct

The Array construct is defined by the following attributes: a short name; a long name; the number of elements within the array, display flags; and a reference to the element type, including a Structure, Alternatives or an Array Construct. As is denoted in FIG. 5, an Array construct can contain references to Structure constructs, Alternatives constructs and/or other Array constructs.

6. The Alternatives Construct

In a presently preferred embodiment, an "Alternatives" construct is provided for providing further flexibility in defining a physical layer data frame, as well as the various protocol messages that may be transported by the physical layer frame. The Alternatives construct includes the same attributes as the Structure construct. In addition, it contains a list of child Alternatives, Structure or Array constructs. For each of these constructs, it specifies a matching value along with an offset value. The offset value specifies where to look for the matching value relative to the starting point of message content being defined by the Alternatives construct.

Thus, the Alternatives construct is equipped to provide the ability to describe the contents of a data frame (or the contents of a higher level protocol message) that may contain any one of several alternatives. Moreover, the identity of which alternative is present is determined by interrogating the value contained within specified field(s) of the data frame (or higher level protocol message). Following is an example of the use of the Alternatives construct:

Struct 111, Ether, Ethernet Frame,
  Destination
  Source
  EtherType
  EtherPlds
Func 000, EtherPlds, Ethernet Payload,
  CaseOffset–16, 0800, IPH
  CaseOffset–16, 0806, ARP
Struct 101, IPH, Internet Protocol Header, 160
  Ver
  Type Of Service
  Total Length
  ID
  Offset 1
  MBF
  Last Frag
  FragmentOffset
  Time To Live
  IP Protocol
  Header Checksum
  Source Address
  Destination Address
Struct 101, ARP, Address Resolution Protocol, 224
  HType
  ARP Protocol
  HW AddrLen
  ProtAddrLen
  ARP OpCode
  HW AddressOfSender
  ProtocoLAddressOfSender
  HW AddressOfTarget
  ProtocolAddressOftarget In this particular example, The "Ethernet Frame" Structure construct is defined as containing three fields, Destination, Source and EtherTypes, similar to that described above. In addition, the Ethernet Frame Structure construct includes reference to an EtherPlds (or Ethernet Payload) short name. In the example, this refers to an Alternatives construct having that name, indicating that the content of the EtherPlds field portion of the Ethernet data frame could be several alternatives. First, the EtherPlds Alternatives construct specifies that the content is an "IPH" (Internet Protocol Header—i.e., implying an IP message) if the matching value of 0800 (hex) is present at the data frame location corresponding to specified offset, which is −16 bits relative to the beginning point of the Ethernet Payload (note that this offset location corresponds to the EtherType field within the data frame). Alternatively, the EtherPlds Alternatives construct specifies that the content is an "ARP" (Address Resolution Protocol) message if the matching value of 0806 (hex) is present at the data frame location corresponding to specified offset, which again is −16 bits relative to the a beginning point of the Ethernet Payload in the data frame. Thus, this example protocol definition addresses an IP over Ethernet situation, and an ARP over Ethernet situation by way of the flexible Alternatives construct. In addition, Field constructs can be defined for the IPH Structure and the ARP Structure, as previously described.

It will be appreciated that additional Alternatives constructs could be used, to specify yet additional protocol alternatives. For example, the IP protocol message could in turn have a payload that contains other protocol message alternatives, such as TCP, UDP or others. Again, use of an Alternatives construct would provide the ability to discern from a number of alternatives that may potentially be contained within, for example, the IP payload. This is shown in the following example, which illustrates yet another application of the Alternatives construct:

Struct 111, Ether, Ethernet Frame,
    Destination
    Source
    EtherType
    EtherPlds
Func 000, EtherPlds, Ethernet Payload,
    CaseOffset−16, 0800, IP
    CaseOffset−16, 0806, ARP
Struct 000, IP, Internet Protocol,
    IPH
    IPPlds
Struct 101, IPH, Internet Protocol Header, 160
    Ver
    Type Of Service
    Total Length
    Offset 1
    MBF
    FragmentOffset
    Time To Live
    IP Protocol
    Header Checksum
    Source Address
    Destination Address
Func 000, IPPlds, IP Payloads,
    CaseOffset−88, 06, TCP
Struct 101, ARP, Address Resolution Protocol, 224
    HType
    ARP Protocol
    HW AddrLen
    ProtAddrLen
    ARP OpCode
    HW AddressOfSender
    ProtocolAddressOfSender
    HW AddressOfTarget
    ProtocolAddressOfTarget Struct 111, TCP, Transmission Control Protocol Header, 160
    Source Port
    Destination Port
    Seq Number
    Ack Number
    Data Offset
    Offset 6
    URG
    TCP ACK
    PSH
    RST
    SYN
    FIN
    TCP Window
    TCP Checksum
    Urgent Pointer This example is similar to the previous example, except that the reference to "IPH" in the "EtherPlds" Alternates construct is replaced with a new alternative, "IP." This alternative Structure construct in turn is defined to contain "IPH" (IP Header) Structure construct, and an IPPlds (IP Payloads) Alternatives construct. The IPPlds Alternatives construct specifies one alternative; specifically, if the matching value of 06 (hex) is present at the data frame location corresponding to specified offset, which is −88 bits relative to the beginning point of the IP Payload (note that this location corresponds to the IP Protocol field within the IP Header), then the IP Payloads includes a Structure construct referred to as "TCP" (long name Transmission Control Protocol Header). Thus, this definition—using Alternatives constructs—defines a full Ethernet-IP-TCP stack.

It will be appreciated from the above that the fact that alternatives are defined by identifying match values at relative locations within particular protocol messages provides much flexibility. In particular, it provides a means for describing many different protocol stack combination scenarios. In addition, the definition of the IP-TCP stack via Alternatives constructs could be reused on top of other physical layer protocols, such as Fibre Channel (or InfiniBand, etc.)—because the relative offset positions within the higher level protocols does not change. Thus, the definitions specified by the Alternatives constructs for different a protocol stack combinations can be reused from one physical layer protocol to another. This adds efficiency to the process of defining protocols.

7. The Switch Construct

There are some circumstances where it may not be possible to ascertain the format of a data frame based on values contained within certain of its fields (e.g., a "type" field). In such a case, the format may possibly be revealed based upon the context of the network transaction involving multiple data frames. In this scenario, a "Switch" construct is utilized in a presently preferred embodiment.

For example, SCSI (Small Computer System Interface) commands carried within Fibre Channel physical layer data frames can vary depending on the types of network connected devices that are exchanging the frames. Device types would include: SCSI Direct Access Devices (e.g., hard-drives); SCSI Sequential Devices (e.g. tape drives); and SCSI Medium Changers. However, in communications involving these types of devices, it is not possible to identify the device type via the capture of a single data frame. Use of the Switch definition construct addresses this problem. For example, a Switch "SCSI Interpretation" having three members, one for each of the device types noted above can be defined. An Alternatives construct can then be used to describe the structure of the command based on each switch member. In this case, each alternative specified by the Alternatives construct does not have a relative match value, but has instead a reference to a switch member. In this manner, the ambiguity of the data frame content (ie., SCSI command type) can be resolved by knowing the context of the particular transaction.

Following is an example illustrating a possible implementation of the Switch Construct:

Func 000, CDB_FM_DS, CDB_FM_DS,
    CaseId Sequential Devices, CDB_FM_S
    CaseId Direct Access Devices, CDB_FM_DA
Switch, SCSI Interpretation
    Direct Access Devices
    Sequential Devices
    Medium Changers In this example, an Alternatives construct is used to define an alternative named "CDB_FM_DS." The first alternative is a 'CaseId' statement, to which is specified a switch member, defined as switch member "Sequential Devices." The 'CDB_FM_DS' alternatives is used because the CDB Format Medium has 2 possible structures for the same SCSI command 0x04. Therefore it is not possible to know which structure is part of frame just by looking at a single frame. As noted, it is possible to know the structure if the device type in the conversation is known: 'Direct Access Device' or 'Sequential Device'. The Alternatives with 'CaseId' statement permits ambiguities in protocol message to be resolved. In fact, an external agent can be used to enable the proper switch member (in this case 'Sequential Devices' or 'Direct Access Devices'), and therefore the ambiguity can be resolved. In the preferred embodiment, the SCSI interpretation ambiguity can be resolved by displaying the "SCSI Interpretation" switches in the protocol analyzer software. Looking at a sequence of frames in the protocol analyzer, the user can set the proper switch member because the user knows what type of device was part of the conversation, and then the SCSI commands are interpreted accordingly.

8. The Group Construct

In a presently preferred embodiment, a definition construct referred to as the Group construct is provided. The Group construct is separated into two types, the Field Group and the Message Group, neither of which is used to describe protocol messages, Instead, these constructs are used to group fields (Field Group construct), and to group protocol messages (Message Group construct) into summaries that can be displayed for the user's convenience.

B. Protocol Editor Having a Graphical Interface

As already noted, the preferred collection of definition constructs are intended to collectively define a given physical layer protocol, along with the various protocol stack combinations that may be encountered. In preferred embodiments, the constructs are assembled within a text file. For example, a single text file for each physical layer protocol could be created, and then stored within a protocol database, such as that illustrated in FIG. 4. This protocol definition file will then be used to interpret captured frames (for example, as indicated at program step 82 in FIGS. 3A and 3B. It will be appreciated that this protocol definition file, with the corresponding collection of definition constructs, could be created in any one of a number of different ways. For example, a simple text editor could be used to manually enter each of the pertinent definition constructs and create a definition file.

However, in a presently preferred embodiment, creation of the protocol definition file is accomplished with an editor having a graphical front-end interface. Such a graphical interface provides the user with a series of graphically oriented screens, menu options, dialogs and data entry fields and selection points that assist in the preparation of a protocol definition file. Use of the editor achieves the end result of producing a protocol definition file having all of the necessary definition constructs, but does so in a much more intuitive and easy-to-use manner from a user standpoint. In particular, the graphical interface allows a user to create an appropriate definition file without having to know all of the intricacies and formats of the specific definition constructs such as those described above. Preferably, this graphical interface also provides the means for interaction between the protocol analyzer of the preferred embodiment, and the user. This interaction includes, for example, display of the results of the frame analysis.

It will be appreciated that such an application using this type of graphical interface environment could be produced using a number of techniques and development environments. However, in a preferred embodiment the graphical user interface of the protocol editor is preferably coded in the Microsoft Visual C++ programming language produced by Microsoft Corporation, Redmond, Wash., and operates in an appropriate version of the Microsoft Windows operating system environment, also produced by Microsoft.

Figure 6:
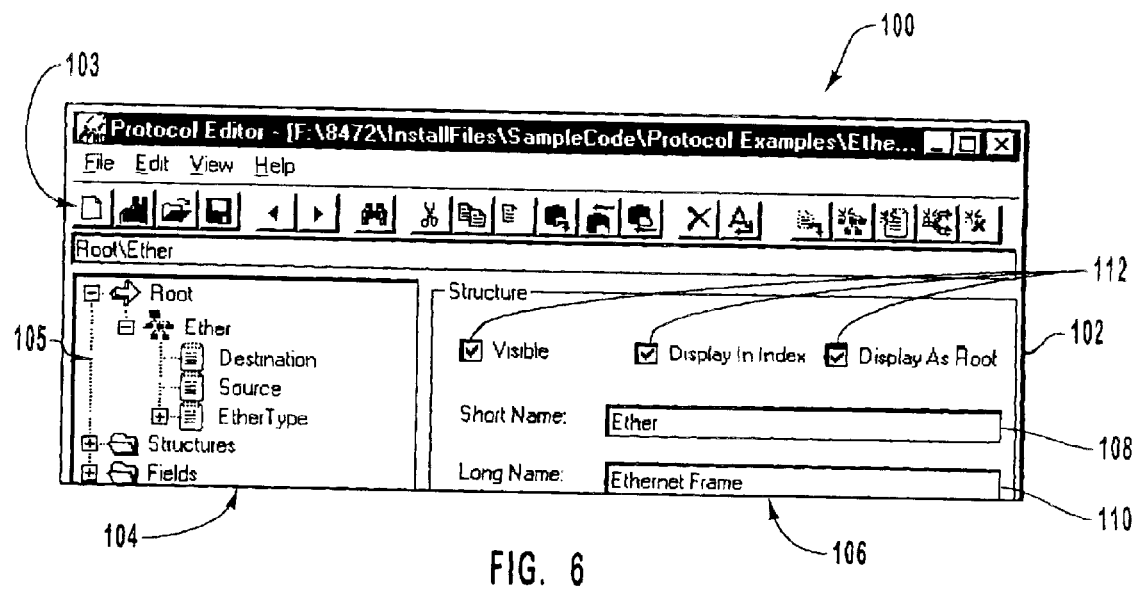
FIG. 6 illustrates an example of a graphical user interface of the protocol editor of one preferred embodiment of the invention.

Continuing now with the drawings, reference is next made to FIG. 6, which illustrates one example of a preferred graphical interface, designated at 100, for defining a Structure construct, such as the "Ether" Structure described above. Again, while any suitable graphical environment could be used, in the preferred embodiment a typical Microsoft Windows dialog window 102 is used. The window 102 includes a plurality of protocol editor option dialog buttons, designated at 103, that can be selected by the user (via a mouse controlled pointer, for example) to invoke a particular function. For example, here one of the dialog buttons 103 would correspond to a "create Structure" function, which would invoke a screen such as that shown on the right hand side 106 of the window. As is shown, this window would include data entry areas for creating a Structure, including an area for entering a short name 108, and an area for entering a long name 110. Other relevant data entry areas could also be included, such as bit length, etc. Also shown are a series of "display options" 112, selection of which will invoke a corresponding display flag for the Structure.

In a presently preferred embodiment, the graphic window 102 also includes an area, designated at 104, that displays a hierarchical view of the construct definitions, and their relationship to one another. Here, for example, the "Ether" structure position within the tree is shown. Preferably, the structure currently being defined would be highlighted within tree 105; here, the words "Ether" would be highlighted. Also, this "tree" view allows a user to subsequently select a component of the tree to display the defined characteristics of that component in the right hand side 106 of the window.

Figure 7:
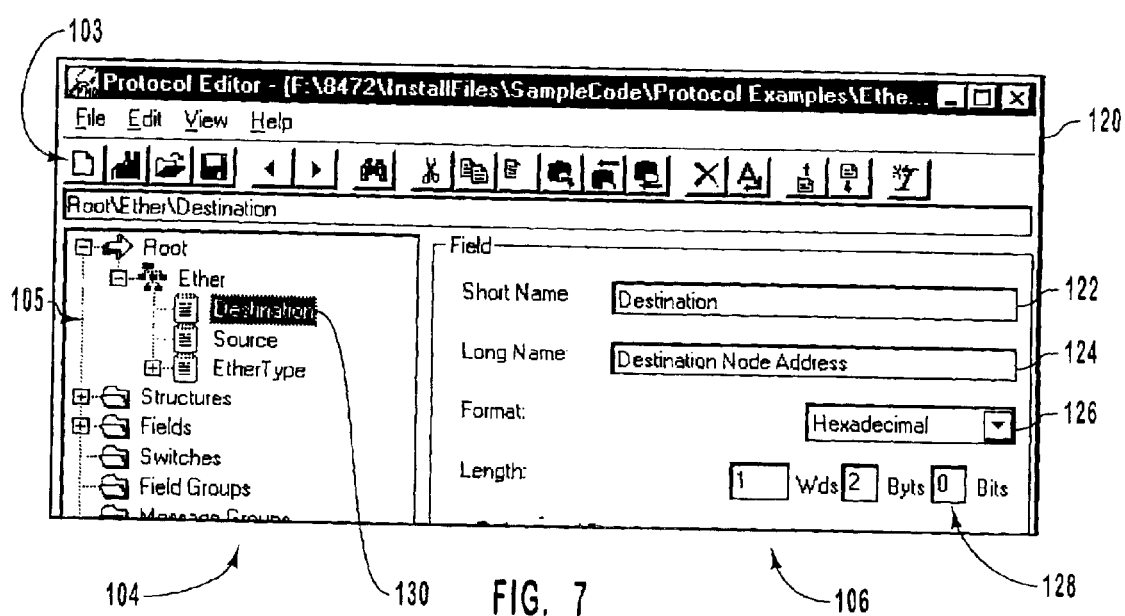
FIG. 7 illustrates another example of a graphical user interface of the protocol editor.

FIG. 7 illustrates one example of how a Field construct may be defined via a an embodiment of a graphical protocol editor. In this example, a user would select a "Define Field" option from the options 103, and the right hand window portion 106 would present options relevant to the creation of a Field construct, in this case the "Destination" field. For example, a field for a short name 122, a long name 124 and display format 126 would be provided for user input. Similarly, a field for defining the bit length 128 would be displayed for entry by the user. Again, in the illustrated embodiment the left hand side of the window 104 displays the Field within the context of the hierarchical tree view 105, and the current Field is highlighted ("Destination") within the tree, as is shown at 130.

Figure 8:
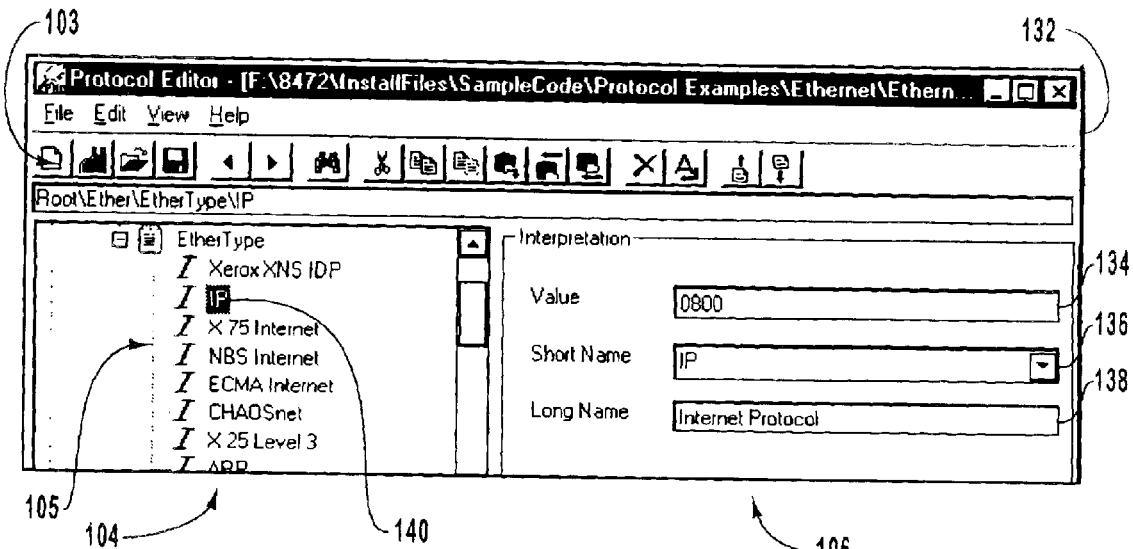
FIG. 8 illustrates yet another example of a graphical user interface of the protocol editor.

FIG. 8 illustrates one example of a graphical interface for defining an Interpretation construct. Again, the user would typically select an appropriate option from the dialog buttons 103, such as an "Interpretations Define" button, which would cause a view such as is shown in the right had side 106 of the window 132. This window portion would include areas for the user to define various Interpretation constructs for a field, in this case the "EtherType" field. For example, a matching value (0800) 134 would be entered, along with a short 136 and long name 138 that corresponds to the interpretation for this matching value, which in this case is "Internet Protocol." Again, the left hand side 104 of the window 132 preferably displays the tree structure, highlighting the corresponding Interpretation construct (IP) 140.

Figure 9:
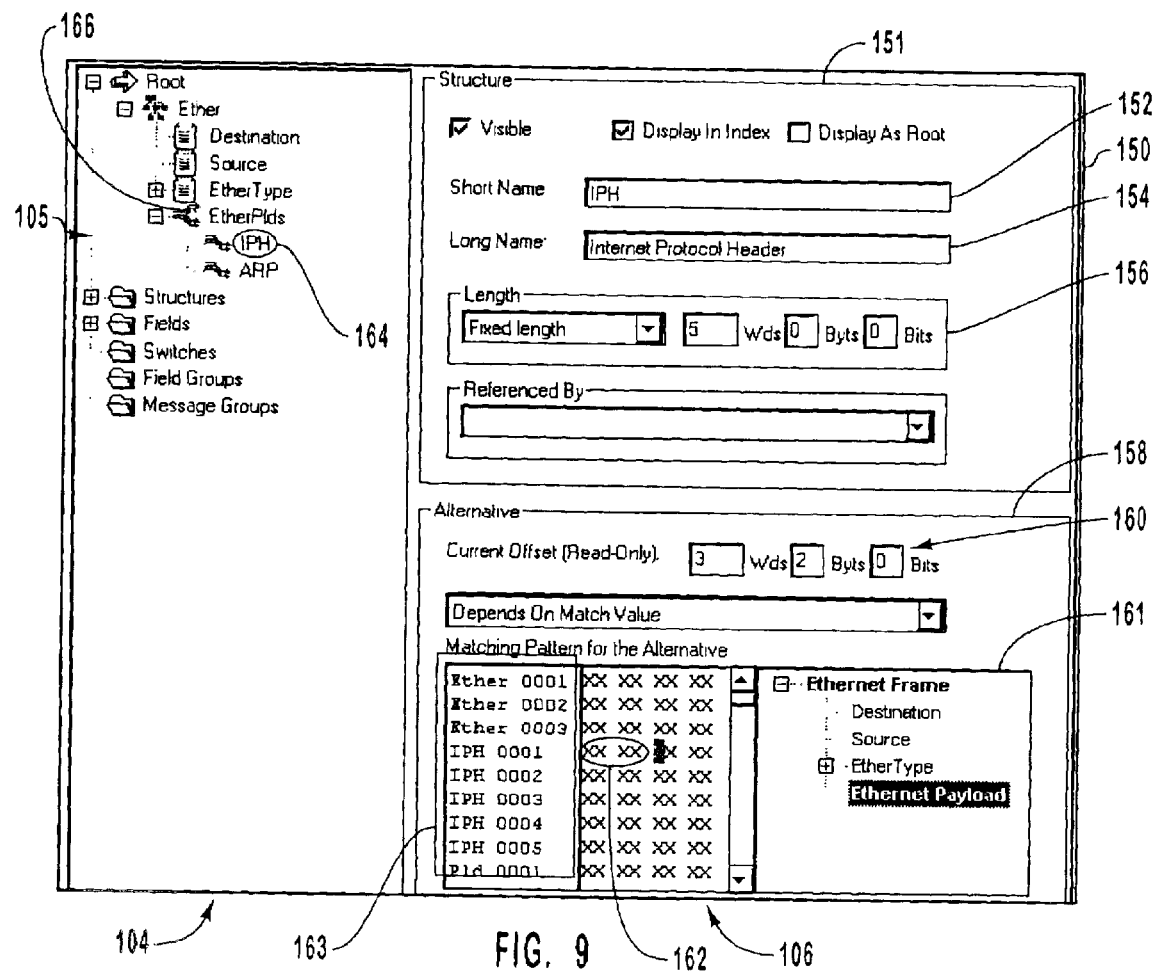
FIG. 9 illustrates yet another example of a graphical user interface of the protocol editor.
Figure 10:
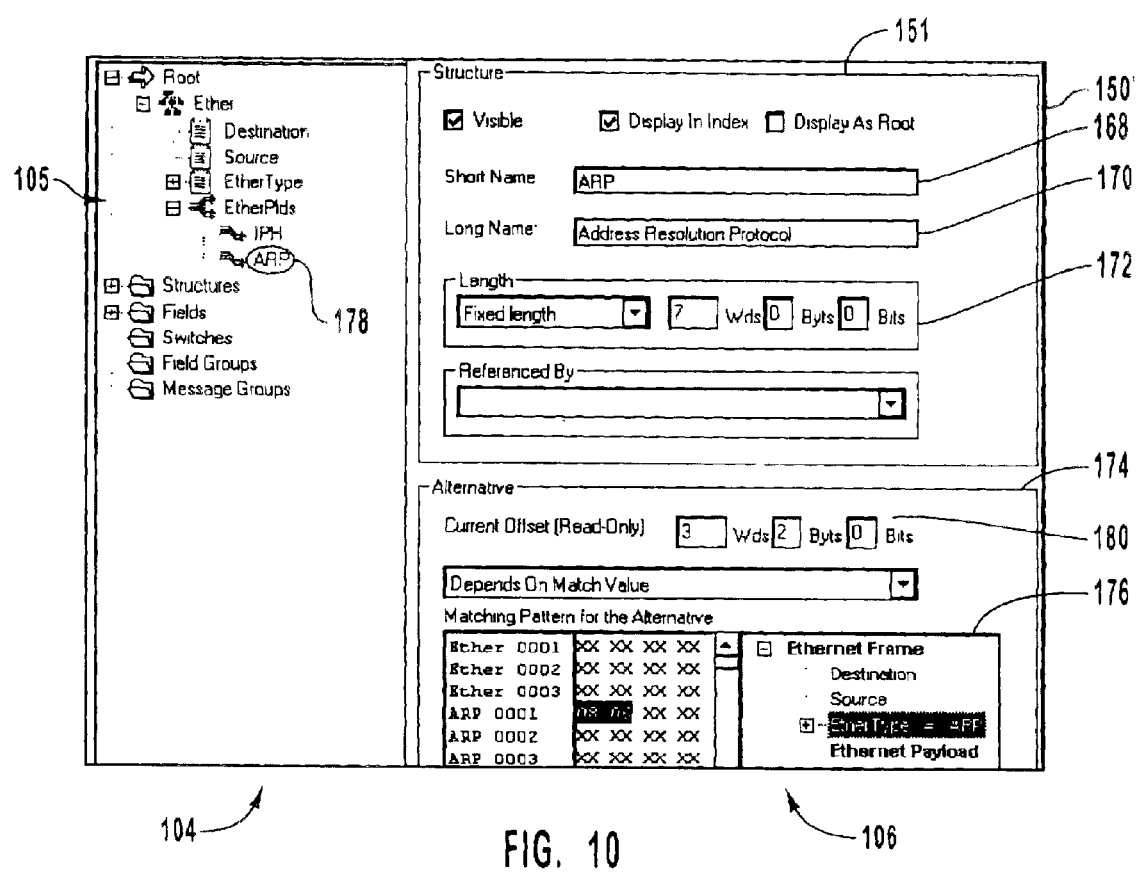
FIG. 10 illustrates another example of a graphical user interface of the protocol editor.

Reference is next made to FIGS. 9 and 10 together, which provide an example of the how an Alternatives construct, in this case the "EtherPlds" construct, may be generated via a protocol editor having a graphical interface. First, a Alternatives construct named "EtherPlds" would be defined and appended to the Ethernet frame structure. In addition, in this example two Alternative constructs are defined: one named "IPH" and the other "ARP." These constructs are shown within the context of the hierarchical tree 105 shown in the left hand side 104 of the window 150. FIG. 9 illustrates, in the "Structure" area of the window at 151, the areas to enter the definitional characteristics of the "IPH" alternative, including its short and long names 152, 154, as well as its length 156. FIG. 10 shows the similar approach for defining the "ARP" alternative.

FIG. 9 also illustrates how in a preferred environment, selection of the "IPH" node 164 by the user will cause the display of a "result" area 161, which illustrates the IPH alternative structure in the data frame represented at 163 (ie., three words with the prefix "Ether" for Ethernet frame, and five words with the prefix "IPH" for the IP Header). FIGS. 9 and 10 also illustrate how each of these alternatives is differentiated by way of the "EtherType" field. For example, in FIG. 9, the EtherType field can be selected within the result window 161, and the "Internet Protocol" interpretation selected. This will force the two first bytes (at 162) of the fourth word (shown at display area 160, ie., the "offset" for the Alternatives construct) to be set to 0x800 (which indicates IP, ie., the "Matching value" for the Alternatives construct). Alternatively, in FIG. 10, a user would select the "ARP" node to set the same bytes to a value of 0x806, indicating the presence of an Address Resolution Protocol, in the result window 176.

As can be seen from FIGS. 6 through 10, preferred embodiments of the protocol editor graphical interface provide an ideal means for generating the appropriate definition constructs for inclusion in a protocol definition file. As can be seen from the above, the illustrated embodiments provide a number of advantages. For example, the hierarchical tree view provided on the left-hand side (104) of the display window is used to visually build the protocol message definitions out of the requisite Structures, Fields, Interpretations and Alternatives constructs. In addition, the upper panel on the right-hand side of each display window shows the attributes of the "node" selected in the left-hand tree. This provides the user with a convenient way for reviewing attribute values, and/or for modifying attributes. Also, the lower window on the right-hand side, referred to as the "result" window, visually highlights the position of the "node" selected in the left-hand tree. Moreover, it also highlights the structure of an actual data frame that would contain the node selected.

Figure 11:
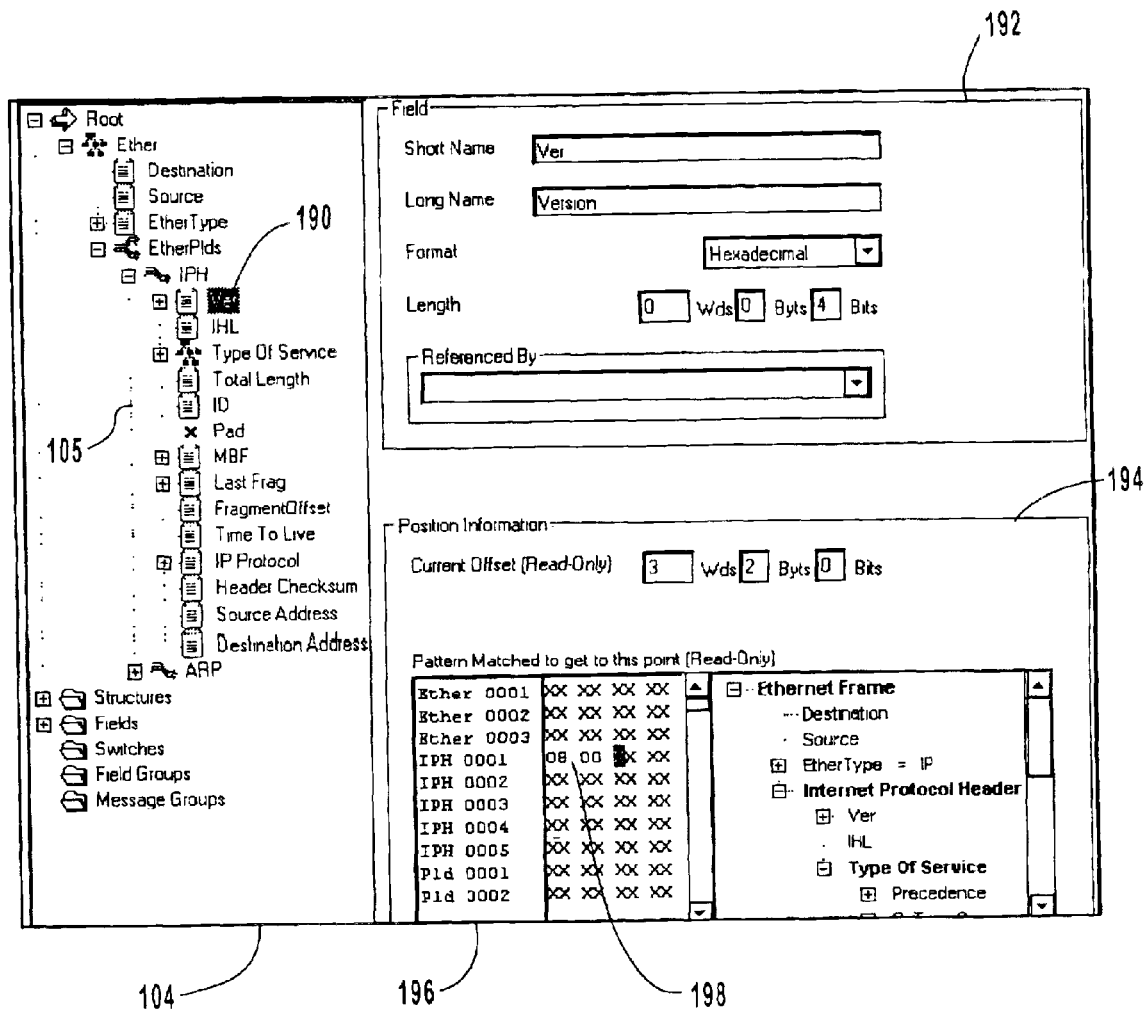
FIG. 11 shows yet another example of a graphical user interface of the protocol editor.

For example, FIG. 11 illustrates yet another graphics Window illustrating some of these concepts. Here, the field "Ver" (at 190) is selected by the user within the hierarchical tree on the left-hand side 104 of the Window, and highlighted. The properties of "Ver" are displayed in the top-right panel 192. The result panel 194 of the window displays the current offset of 3 words 2 bytes for that field inside an Ethernet frame, represented at 196. The result panel 194 also highlights that the first two bytes of the fourth Ethernet frame word need to be 0x0800 (at 198) in order to have an IP header with the "Ver" field.

In preferred embodiments, the result panel 194 of the window is read-only when fields and structures are selected on the left-hand tree. However the fields within this panel become editable when an alternative node like 'IPH' or 'ARP' is selected. In this way, structures such as "IP" and "ARP" can be defined directly inside the Ethernet payload, by specifying the bits that must be set in order to obtain the IP or the ARP payload. Again, this provides an extremely and intuitive interface for defining a variety of definition constructs.

As noted above, the Edit menu and the toolbar list the various actions that can be performed on the current node selected in the left-hand tree. Also, a context menu could be provided, via for example a right-mouse-button click, which also lists these or other actions.

VI. Frame Interpretation and Display

As previously indicated in the preferred process flow of FIGS. 3A and 3B, once a protocol definition file for the relevant protocol has been completed it is loaded into the protocol analyzer database. The definition constructs of the definition file will then be used to interpret the captured frames, and to identify appropriate descriptions of the interpreted frames. This interpreted frame can then be provided to the user, such as by way of a video display.

While any one of a number of different display formats could be utilized, in a presently preferred embodiment a graphical user interface, having a look and feel similar to that of the graphical interface of the protocol editor, is used. One example of such an interface for providing a display of an interpreted data frame is shown in FIG. 12, to which reference is now made.

The window in FIG. 12, designated generally at 200, illustrates one possible view of an interpreted frame. In general, the window 200 preferably provides a view of the frame contents in a numeric format, along with a view providing a higher level description and identification of various aspects of the frame and its contents. In this way, the frame contents are easily understood by a user.

In the illustrated example the result screen 200 displays a designation of a plurality of captured frames indicated in the top portion of the screen at 202. Here, each line of information corresponds to a single captured data frame. Also, as can be seen, various attributes of the frame are provided, and aligned with corresponding descriptive headings at 204. Note that in preferred embodiments, the user can select from a plurality of different attributes that will be displayed in this view.

In a presently preferred embodiment, a user can select one of the frames displayed in the area 202, which then causes a more detailed view of that frame to be shown in the area designated at 206. For example, in a preferred embodiment several different detailed views are provided. In the left hand side 208 of the window, a detailed view of the individual frame is shown. In the illustrated embodiment, this view shows the actual hexadecimal representation of the frame contents at area 210 and a short description of the layout of the Ethernet frame area at 212.

On the right hand side 214 of the screen a more detailed view of the data frame, is displayed. As is shown, this portion of the window illustrates an interpreted version of the frame corresponding to the definition constructs used to define it. In particular, the frame is illustrated in a hierarchal, tree-type representation that provides an easy to understand view of the overall structure of the frame, along with descriptive terms specifically identifying the individual components of the frame. Note that in preferred embodiments, the various aspects of the hierarchal tree can be further expanded or collapsed depending on the actual view of the frame desired by the user, and the amount of detail required.

Figure 13:
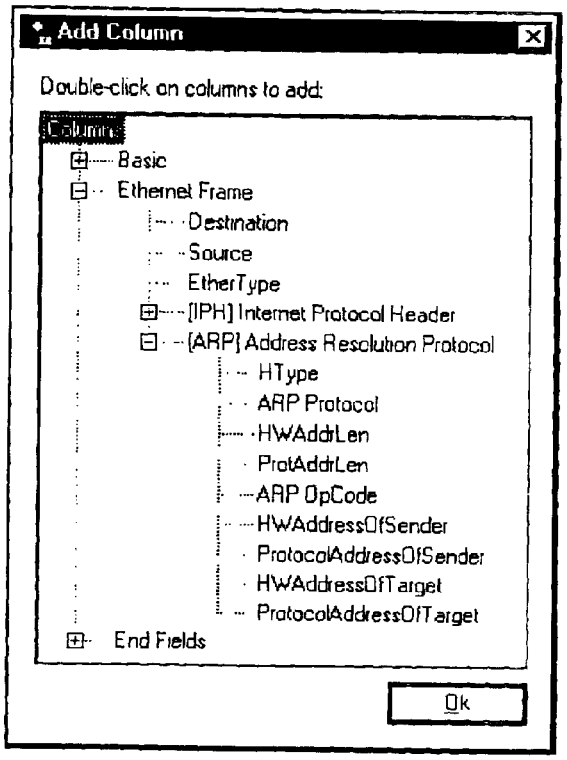
FIGS. 13–15 illustrate examples of alternative graphical user interface applications utilizing a protocol definition file.
Figure 14:
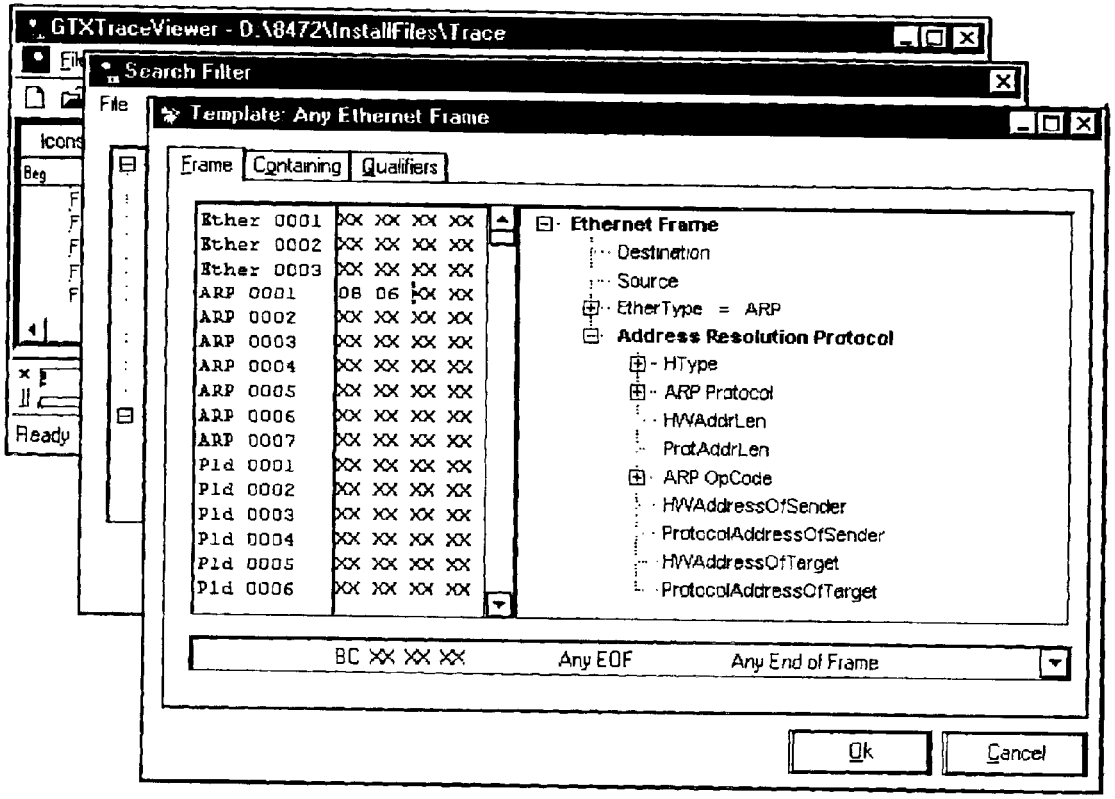
Figure 15:
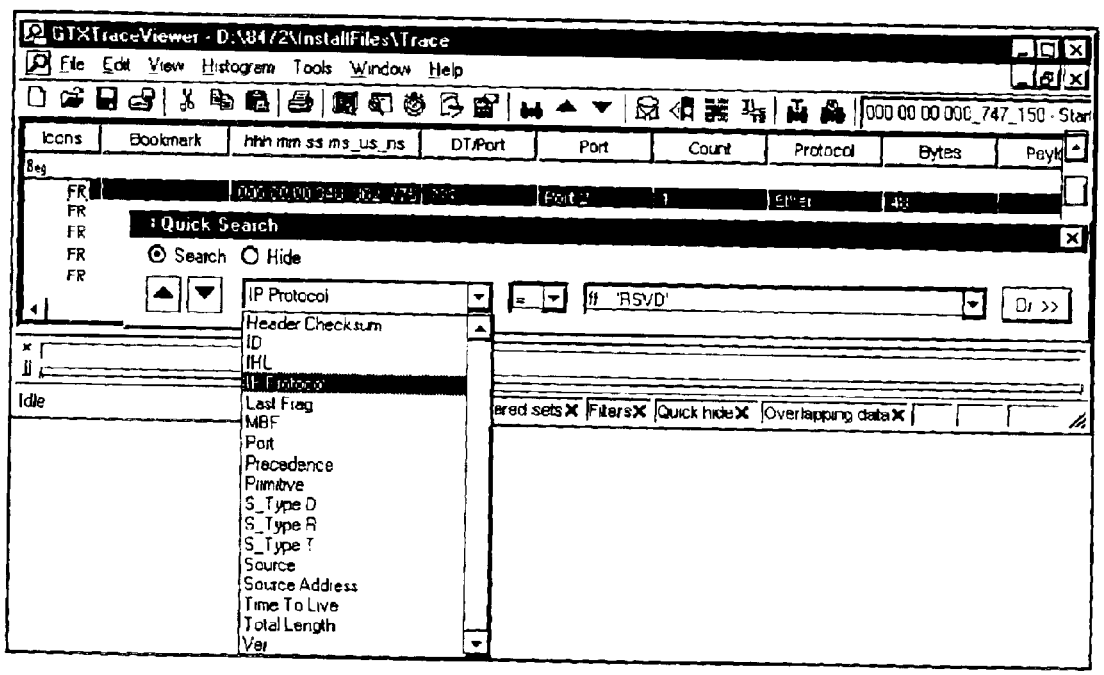

Also, in other preferred embodiments, the display environment will provide a number of display options to the user. For example, the user can select which fields/columns are to be displayed for the frame in area 202 of the window. This type of option is illustrated in FIG. 13. Also, a screen option that allows the user to select certain filter and search parameters to locate frames satisfying specified conditions could be utilized. For example, the user may desire to look at only data frames containing "ARP" traffic. In such a case a filter could be defined such that only those frames satisfying that condition will be displayed. Alternatively, one window could provide a search option, whereby the user can search for specific field values in the data frame. These approaches are shown by way of example in FIGS. 14 and 15. Other options could also be provided.

It will be appreciated that the flexibility provided by the protocol definition file allows for a myriad of different display formats and types. Moreover, the definition constructs provide for a high level description to be provided for the various fields and protocols contained within the data frame. Moreover, in some embodiments, the view environment (such as that shown in FIG. 12) would allow the user to invoke the protocol editor and modify and edit the protocol definition file at any time, thereby allowing for different views, descriptions and/or analyses to be performed. Again, this illustrates the high level of flexibility provided by the protocol definition file that otherwise is not present in previously existing protocol analyzers.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

APPENDIX A to
United States Patent Application
for
SYSTEMS AND METHODS FOR
INTERPRETING COMMUNICATIONS PACKETS

```
########################################################
# Ethernet-IP-TCP.pmd

# Copyright (c) 2001 Finisar Corporation
########################################################
################### Structures #####################
Struct 111, Ether, Ethernet Frame,
```

APPENDIX A-continued

```
    , Destination
    , Source
    , EtherType
    , EtherPlds
Func 000, EtherPlds, Ethernet Payload,
    , CaseOffset-16, 0800, IP
    , CaseOffset-16, 0806, ARP
Struct 111, IPH, Internet Protocol Header, 160
    , Ver
    , IHL
    , Type Of Service
    , Total Length
    , ID
    , Offset 1
    , MBF
    , Last Frag
    , FragmentOffset
    , Time To Live
    , IP Protocol
    , Header Checksum
    , Source Address
    , Destination Address
Struct 001, Type Of Service, Type Of Service, 8
    , Precedence
    , S_Type D
    , S_Type T
    , S_Type R
Struct 111, ARP, Address Resolution Protocol, 224
    , HType
    , ARP Protocol
    , HWAddrLen
    , ProtAddrLen
    , ARP OpCode
    , HWAddressOfSender
    , ProtocolAddressOfSender
    , HWAddressOfTarget
    , ProtocolAddressOfTarget
Struct 111, TCP, Transmission Control Protocol Header, 160
    , Source Port
    , Destination Port
    , Seq Number
    , Ack Number
    , Data Offset
    , Offset 6
    , URG
    , TCP ACK
    , PSH
    , RST
    , SYN
    , FIN
    , TCP Window
    , TCP Checksum
    , Urgent Pointer
Struct 000, IP, Internet Protocol,
    , IPH
    , IPPlds
Func 000, IPPlds, IP Payloads,
    , CaseOffset-88, 06, TCP
################### Groups #########################
################### Switches #######################
################### Fields #########################
Field, Destination, Destination Node Address, " ", 48
Field, Source, Source Node Address, " ", 48
Field, EtherType, Higher Layer Protocol Type, " ", 16
    , 0600, Xerox XNS IDP, Xerox XNS IDP
    , 0800, IP, Internet Protocol
    , 0801, X.75 Internet, X.75 Internet
    , 0802, NBS Internet, NBS Internet
    , 0803, ECMA Internet, ECMA Internet
    , 0804, CHAOSnet, CHAOSnet
    , 0805, X.25 Level 3, X.25 Level 3
    , 0806, ARP, Address Resolution Protocol
    , 0bad, Banyan Systems, Banyan Systems Inc.
    , 6001, DEC MOP Dump/Load Assitance, DEC MOP Dump/Load
        Assitance
    , 6002, DEC MOP Remote Console, DEC MOP Remote Console
    , 6003, DEC DECnet Phase IV, DEC DECnet Phase IV
    , 6004, DEC LAT, DEC LAT
    , 6005, DEC DECnet Diagnostics, DEC DECnet Diagnostics
```

APPENDIX A-continued

```
    , 601[00XX], 3Com Corporation, 3Com Corporation
    , 6014, 3Com Corporation, 3Com Corporation
    , 700[000X], Ungermann-Bass download, Ungermann-Bass download
    , 7002, Ungermann-Bass download, Ungermann-Bass download
    , 7030, Proteon, Proteon
    , 7034, Cabletron, Cabletron
    , 8035, Reverse ARP, Reverse ARP
    , 8046, AT&T, AT&T
    , 8047, AT&T, AT&T
    , 808[100X], Xyplex, Xyplex
    , 808a, Xyplex, Xyplex
    , 809b, Appletalk over Ethernet, Appletalk over Ethernet
    , 80c[00XX], Digital Communication Associates, Digital
      Communication Associates
    , 80d5, IBM SNA Services over Ethernet, IBM SNA Services over
      Ethernet
    , 80f2, Retix, Retix
    , 80f3, Kinetics, Kinetics
    , 80f4, Kinetics, Kinetics
    , 80f5, Kinetics, Kinetics
    , 80f7, Apollo Computer, Apollo Computer
    , 8Off, Wellfleet Communications, Wellfleet Communications
    , 810[00XX], Wellfleet Communications, Wellfleet Communications
    , 8137, Novell, Novell
    , 8138, Novell, Novell
Field, Ver, Version, " ", 4
    , 4, IP, Internet Protocol
    , 5, ST, ST Datagram Mode
    , 6, Ipv6, Internet Protocol v6
    , 7, TP/IX, The Next Internet
    , 8, PIP, The P Internet Protocol
    , 9, TUBA, TUBA
Field, IHL, Header Length in Words, " ", 4
Field, Precedence, Precedence, " ", 3
    , 0, Routine, Routine
    , 1, Priority, Priority
    , 2, Immediate, Immediate
    , 3, Flash, Flash
    , 4, Flash override, Flash override
    , 5, CRITIC/ECP, CRITIC/ECP
    , 6, Internet Control, Internet Control
    , 7, Network Control, Network Control
Field, S_Type D, S_Type Delay, " ", 1
    , 0, Off, Normal Delay
    , 1, LOW, Low Delay
Field, S_Type T, S_Type Throughput, " ", 1
    , 0, Off, Normal Throughput
    , 1, HIGH, High Throughput
Field, S_Type R, S_Type Reliability, " ", 1
    , 0, Off, Normal Reliability
    , 1, HIGH, High Reliability
Field, Total Length, Total Length in Bytes, " ", 16
Field, ID, Identification, " ", 16
Field, MBF, May Be Fragmented Flag, " ", 1
    , 0, Off, Fragmentation NOT Allowed
    , 1, Allowed, Fragmentation Allowed
Field, Last Frag, Last Fragment, " ", 1
    , 0, Yes, This Is the Last Fragment
    , 1, No, This Is NOT the Last Fragment
Field, FragmentOffset, Fragment Offset, " ", 13
Field, Time To Live, Time To Live, " ", 8
Field, IP Protocol, Protocol, " ", 8
    , 00, RSVD, Reserved
    , 01, ICMP, Internet Control Message
    , 02, IGMP, Internet Group Management
    , 03, GGP, Gateway-to-Gateway
    , 04, IP, IP in IP (encapsulation)
    , 05, ST, Stream
    , 06, TCP, Transmission Control
    , 07, UCL, UCL
    , 08, EGP, Exterior Gateway Protocol
    , 09, IGP, Any private interior Gateway
    , 0a, BBN-RCC-MON, BBN RCC Monitoring
    , 0b, NVP, Network Voice Protocol
    , 0c, PUP, PUP
    , 0d, ARGUS, ARGUS
    , 0e, EMCON, EMCON
    , 0f, XNET, Cross Net Debugger
    , 10, CHAOS, Chaos
    , 11, UDP, User Datagram
    , 12, MUX, Multiplexing
    , 13, DCN, DCN Measurement Subsystems
    , 14, HMP, Host Monitoring
    , 15, PRM, Packet Radio Measurement
    , 16, XNS, XEROX NS IDP
    , 17, TRNK1, Trunk-1
    , 18, TRNK2, Trunk-2
    , 19, LF1, Leaf-1
    , 1a, LF2, Leaf-2
    , 1b, RDP, Reliable Data protocol
    , 1c, IRTP, Internet reliable Transaction
    , 1d, ISOTP4, ISO Transport Protocol Class 4
    , 1e, NETBLT, Bulk Data Transfer Protocol
    , 1f, MFENSP, MFE Network Services Protocol
    , 20, MERIT, MERIT Internodal Protocol
    , 21, SEP, Sequential Exchange Protocol
    , 22, 3PC, Third Party Connect Protocol
    , 23, DPR, Inter-Domain Policy Routing Protocol
    , 24, XTP, XTP
    , 25, DDP, Datagram Delivery Protocol
    , 26, IDPRCMTP, IDPR Control Message Transport Protocol
    , 27, TP++, TP++ Transport Protocol
    , 28, IL, IL Transport Protocol
    , 29, SIP, Simple Internet Protocol
    , 2a, SDRP, Source Demand Routing Protocol
    , 2b, SIPSR, SIP Source Route
    , 2c, SIPFRAG, SIP Fragment
    , 2d, IDRP, Inter-Domain Routing Protocol
    , 2e, RSVP, Reservation Protocol
    , 2f, GRE, General Rotuing Encapsulation
    , 30, MHRP, Mobile Host Routing Protocol
    , 31, BNA, BNA
    , 32, SIPPESP, SIPP Encap Security Payload
    , 33, SIPPAH, SIPP Authentication Header
    , 34, INLSP, Integrated Net Layer Security
    , 35, SWIPE, IP with Encryption
    , 36, NHRP, NBMA Next Hop Resolution Protocol
    , 3d, ANYHOST, Any Host Internal Protocol
    , 3e, CFTP, CFTP
    , 3f, ANYLOCAL, Any Local Network
    , 40, SATEXPAK, SATNET and Backroom EXPAK
    , 41, KRYPT, Kryptolan
    , 42, RVD, MIT Remote Virtual Disk Protocol
    , 43, IPPC, Internet Pluribus Packet Core
    , 44, DISTFS, Any Distributed File System
    , 45, SATMON, SATNET Monitoring
    , 46, VISA, VISA Protocol
    , 47, IPCV, Internet Packet Core Monitoring
    , 48, CPNX, Computer Protocol Network Executive
    , 49, CPHB, Computer Protocol Heart Beat
    , 4a, WSN, Wang Span Network
    , 4b, PVP, Packet Video Protocol
    , 4c, BRSAT, Backroom SATNET Monitoring
    , 4d, SUNND, SUN ND PROTOCOL - Temporary
    , 4e, WBMON, WIDEBAND Monitoring
    , 4f, WBEXPAK, WIDEBAND EXPAK
    , 50, ISOIP, ISO Internet Protocol
    , 51, VMTP, VMTP
    , 52, SECVMTP, Secure VMTP
    , 53, VINES, VINES
    , 54, TTP, TTP
    , 55, NSFNET, NSFNET-IGP
    , 56, DGP, Dissimilar Gateway Protocol
    , 57, TCF, TCF
    , 58, IGRP IGRP
    , 59, OSPFIGP, OSPFIGP
    , 5a, SPRRPC, Sprite RPC Protocol
    , 5b, LARP, Locus Address Resolution Protocol
    , 5c, MTP, Multicast Transport Protocol
    , 5d, AX.25, AX.25 Frames
    , 5e, IPIP, IP-within-IP Encapsulation Protocol
    , 5f, MICP, Mobile Internetworking Control Pro.
    , 60, SCCSP, Semaphore Communications Sec. Pro.
    , 61, ETHERIP, Ethernet-withing-IP Encapsulation
    , 62, ENCAP, Encapsulation Header
    , 63, PRENCRYO, Any private Encryption Scheme
    , 64, GMTP, GMTP
    , ff, RSVD, Reserved
```

APPENDIX A-continued

Field, Header Checksum, Header Checksum, " ", 16
Field, Source Address, Source Address, "%$i", 32
Field, Destination Address, Destination Address, "%$i", 32
Field, HType, Hardware Type, " ", 16
, 0001, IEEE, IEEE 802 networks
, 0006, IEEE, IEEE 802 networks
Field, ARP Protocol, ARP Protocol, " ", 16
, 0800, IP, IP Protocol
Field, HWAddrLen, Hardware Address Length, " ", 8
Field, ProtAddrLen, Protocol Address Length, " ", 8
Field, ARP OpCode, ARP OpCode, " ", 16
, 0001, REQUEST, ARP Request Packet
, 0002, REPLY, ARP Reply Packet
Field, HWAddressOfSender, Hardware Address Of Sender, " ", 48
Field, ProtocolAddressOfSender, Protocol Address Of Sender, "%$i", 32
Field, HWAddressOfTarget, Hardware Address Of Target, " ", 48
Field, ProtocolAddressOfTarget, Protocol Address Of Target, "%$i", 32
Field, Source Port, Number of the calling port, " ", 16
, 0007, ECHO, Echo
, 0009, DISCARD, Discard
, 000b, USERS, Active Users
, 000d, DAYTIME, Daytime
, 0011, QUOTE, Quote of the day
, 0014, FTP-DATA, File Transfer (Default Data)
, 0015, FTP, File Transfer (Control)
, 0017, TELNET, Telnet
, 0019, SMTP, Simple Mail Transfer
, 0025, TIME, Time
, 002a, NAMESERVER, Host Name Server
, 002b, NICKNAME, Who Is
, 0035, DOMAIN, Domain Name Server
, 0043, BOOTPS, BOOTP Server
, 0044, BOOTPC, BOOTP Client
, 0045, TFTP, Trivial File Transfer
, 004f, FINGER, Finger
, 0050, HTTP, HTTP
, 0066, ISO-TSAP, ISO-TSAP
, 0067, X400, X400
, 0068, X400-SND, X400-SND
, 006f, SUNRPC, Sun Remote Procedure Call
, 0089, NETBIOS-NS, NETBIOS Name Service
, 008a, NETBIOS-DMG, NETBIOS Datagram Service
, 008b, NETBIOS-SSN, NETBIOS Service Service
, 0092, ISO TPO, ISO TPO
, 0093, ISO IP, ISO IP
, 0099, SGMP, SGMP
, 00a1, SNMP, SNMP
, 00a2, SNMPTRAP, SNMPTRAP
, 00a3, CMIP-Manage, CMIP/TCP Manager
, 00a4, CMIP-Agent, CMIP/TCP Agent
, 00c9, AT-RMTP, AppleTalk Routine Maintenance
, 00ca, AT-NDB, AppleTalk Name Binding
, 00cc, AT-ECHO, AppleTalk Echo
, 00ce, AT-ZIS, AppleTalk Zone Information
Field, Destination Port, Number of the called port, " ", 16
, 0007, ECHO, Echo
, 0009, DISCARD, Discard
, 000b, USERS, Active Users
, 000d, DAYTIME, Daytime
, 0011, QUOTE, Quote of the day
, 0014, FTP-DATA, File Transfer (Default Data)
, 0015, FTP, File Transfer (Control)
, 0017, TELNET, Telnet
, 0019, SMTP, Simple Mail Transfer
, 0025, TIME, Time
, 002a, NAMESERVER, Host Name Server
, 002b, NICKNAME, Who Is
, 0035, DOMAIN, Domain Name Server
, 0043, BOOTPS, BOOTP Server
, 0044, BOOTPC, BOOTP Client
, 0045, TFTP, Trivial File Transfer
, 004f, FINGER, Finger
, 0050, HTTP, HTTP
, 0066, ISO-TSAP, ISO-TSAP
, 0067, X400, X400
, 0068, X400-SND, X400-SND
, 006f, SUNRPC, Sun Remote Procedure Call
, 0089, NETBIOS-NS, NETBIOS Name Service
, 008a, NETBIOS-DMG, NETBIOS Datagram Service APPENDIX A-continued , 008b, NETBIOS-SSN, NETBIOS Service Service
, 0092, ISO TPO, ISO TPO
, 0093, ISO IP, ISO IP
, 0099, SGMP, SGMP
, 00a1, SNMP, SNMP
, 00a2, SNMPTRAP, SNMPTRAP
, 00a3, CMIP-Manage, CMIP/TCP Manager
, 00a4, CMIP-Agent, CMIP/TCP Agent
, 00c9, AT-RMTP, AppleTalk Routine Maintenance
, 00ca, AT-NDB, AppleTalk Name Binding
, 00cc, AT-ECHO, AppleTalk Echo
, 00ce, AT-ZIS, AppleTalk Zone Information
Field, Seq Number, Sequence Number, "%u", 32
Field, Ack Number, Acknowledgement Number, " ", 32
Field, Data Offset, Length of TCP Header in words, " ", 4
Field, URG, Urgent Pointer Field Significant, " ", 1
, 0, Off, Not Significant
, 1, Significant, Significant
Field, TCP ACK, Acknowledgement Field Significant, " ", 1
, 0, Off, Not Significant
, 1, Significant, Significant
Field, PSH, Push Function, " ", 1
, 0, Off, Off
, 1, On, On
Field, RST, Reset Connection, " ", 1
, 0, Off, No
, 1, Yes, Yes
Field, SYN, Synchronize Sequence Numbers, " ", 1
, 0, Off, No
, 1, Yes, Yes
Field, FIN, No more data from Sender, " ", 1
, 0, Off, Off
, 1, No more, No more data
Field, TCP Window, Receive Window Size, " ", 16
Field, TCP Checksum, TCP Checksum for header and data, " ", 16
Field, Urgent Pointer, Points to first octect following urgent data, " ", 16
################# Includes #######################

What is claimed and desired to be secured by United States Letters Patent is:

1. A method for describing the content of a data frame present on a communications network having a predetermined physical layer protocol, the method comprising the following steps:

providing a protocol definition file, the protocol definition file including: a first definition construct that defines the format of a data frame that is structured in accordance with the requirements of the predetermined physical layer protocol, and a second definition construct that defines a plurality of message protocol types;

storing the protocol definition file within a protocol database;

capturing a data frame present on the communications network;

ascertaining whether at least one protocol type of at least one message contained within the data frame from the plurality of message protocol types is defined by at least one of the plurality of message protocol types in the second definition construct;

providing a user with a protocol editor for creating a new message protocol type in the protocol definition file if at least one protocol type of at least one message contained within the data frame from the plurality of message protocol types is not defined by at least one of the plurality of message protocol types in the second definition construct; and providing the content of the captured data frame with descriptions of the content of the captured data frame based upon the definitions of the first and the second definition constructs.

2. The method of claim 1, wherein providing a user with a protocol editor comprises providing the user with a text editor.

3. The method of claim 1, wherein providing a user with a protocol editor comprises providing the user with a graphical user interface that includes constructs corresponding to manipulatable fields and options.

4. The method of claim 1, wherein providing the content of the captured data frame comprises displaying graphical controls to allow the user to select what portions of the content of the captured data are displayed.

5. A method for describing the content of a data frame present on a communications network, the method comprising the following steps:

identifying a physical layer protocol;

ascertaining whether a corresponding protocol definition file exists for the identified physical layer protocol;

providing a user with a protocol editor for creating a new protocol definition file for the identified physical layer protocol if a corresponding protocol definition file does not exist for the identified physical layer protocol;

obtaining the data frame from the communications network;

interpreting the data frame according to at least one of the existing protocol definition file and the created protocol definition file; and displaying frame contents and descriptions of the frame contents in accordance with at least one of the existing protocol definition file and the created protocol definition file.

6. The method of claim 5, wherein identifying a physical layer protocol comprises receiving information from a network interface module of a network analyzer.

7. The method of claim 5, further comprising loading at least one of the existing protocol definition file and the created protocol definition file into a database for use by a network analyzer.

8. The method of claim 5, wherein providing a user with a protocol editor comprises providing a user with a text editor.

9. The method of claim 5, wherein providing a user with a protocol editor comprises providing a user with a graphical user interface that includes constructs corresponding to manipulatable fields and options.

10. The method of claim 5, wherein displaying frame contents and descriptions of the frame contents comprises providing a high level description to a user to describe various fields of the frame and its contents.

11. The method of claim 5, wherein displaying frame contents and descriptions of the frame contents comprises displaying graphical controls to allow the user to select what portions the frame contents are displayed.

12. The method of claim 5, further comprising checking for additional frames on the communication network and displaying the additional frame contents and descriptions of the additional frame contents.

13. In a computer system having a graphical user interface including a video display device and a user input device, method of creating and/or editing protocol definition files used for displaying frame contents from a network with descriptions of the data frame contents, the method comprising:

displaying a graphical representation of one or more base constructs;

receiving a user selection of one of the one or more base constructs and displaying structures belonging to a hierarchy under the selected base construct;

receiving a user selection of one of the structures and displaying manipulatable fields and options for describing characteristics of the selected structure;

receiving user input in the fields and options describing characteristics of the selected structure; and building a protocol definition file, that defines the organization of a data frame physical layer protocol, from the user inputs.

14. The method of claim 13, further comprising:

capturing a data frame from a network; and interpreting the data frame according to the protocol definition file.

15. The method of claim 14, further comprising displaying frame contents and descriptions of the frame contents in accordance with the protocol definition file.

16. The method of claim 13, wherein the one or more base constructs comprise constructs for describing at least one of structures, fields, interpretations, padding, alternatives and arrays.

17. The method of claim 13, wherein the one or more base constructs comprise constructs for describing at least one of switches and groups.

18. The method of claim 13, further comprising receiving a description user input with a high-level description of the selected structure.

19. The method of claim 13, wherein displaying a graphical representation of one or more base constructs comprises displaying one or more base constructs with characteristics previously described for structures in the constructs.

20. The method of claim 13, wherein receiving user input in the fields and options describing characteristics of the selected structure comprises receiving at least one of a short name with a unique indentifier for the selected structure, a long name that provides a high-level description of the structure, a length that specifies the length of a structure, and a display flag that determines if data from a data frame corresponding to the structure will be displayed.

* * * * *